United States Patent
Sato et al.

(10) Patent No.: US 9,681,054 B2
(45) Date of Patent: Jun. 13, 2017

(54) IMAGING APPARATUS, IMAGING SYSTEM, IMAGING METHOD, AND COMPUTER-READABLE RECORDING MEDIUM

(71) Applicant: OLYMPUS CORPORATION, Hachioji, Tokyo (JP)

(72) Inventors: Kazuhiro Sato, Sagamihara (JP); Mai Yamaguchi, Tokyo (JP); Yuiko Uemura, Tokyo (JP); Tomomi Uemura, Jakarta (ID); Sachie Yamamoto, Tokyo (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/711,205

(22) Filed: May 13, 2015

(65) Prior Publication Data

US 2015/0249788 A1 Sep. 3, 2015

Related U.S. Application Data

(63) Continuation of application No. PCT/JP2014/064503, filed on May 30, 2014.

(30) Foreign Application Priority Data

Nov. 18, 2013 (JP) .................................. 2013-238313

(51) Int. Cl.
*H04N 5/232* (2006.01)
*H04N 5/44* (2011.01)
(Continued)

(52) U.S. Cl.
CPC ..... *H04N 5/23293* (2013.01); *H04N 1/00183* (2013.01); *H04N 5/23216* (2013.01);
(Continued)

(58) Field of Classification Search
None
See application file for complete search history.

(56) References Cited

U.S. PATENT DOCUMENTS

| 2010/0074613 A1 | 3/2010 | Masuno et al. |
| 2013/0182138 A1* | 7/2013 | Cho ............ G06F 9/4445 348/211.3 |
| 2016/0080643 A1* | 3/2016 | Kimura ......... H04N 5/23206 348/207.1 |

FOREIGN PATENT DOCUMENTS

| JP | 2003250079 A | 9/2003 |
| JP | 2010063052 A | 3/2010 |

(Continued)

OTHER PUBLICATIONS

International Search Report and Written Opinion mailed in corresponding International Patent Application No. PCT/JP2014/064503 on Sep. 2, 2014, consisting of 9 pp.

*Primary Examiner* — Roberto Velez
*Assistant Examiner* — Quan Pham
(74) *Attorney, Agent, or Firm* — Volpe and Koenig, P.C.

(57) ABSTRACT

An imaging apparatus includes: a first communication control unit that receives action instruction information from an external communication device; and a pseudo image generating unit that generates a pseudo image simulatively expressing an action by a user of the imaging apparatus according to an action instruction based on the action instruction information. The action instruction information includes angle change instruction information and shooting instruction information. The pseudo image generating unit generates, based on a position information and a first orientation information respectively acquired upon receipt of the shooting instruction information, as well as on the (Continued)

shooting instruction information, a first pseudo image, and generates, based on the angle change instruction information, a second pseudo image.

9 Claims, 25 Drawing Sheets

(51) Int. Cl.
  *H04N 1/00* (2006.01)
  *G03B 17/18* (2006.01)
(52) U.S. Cl.
  CPC ........... *H04N 5/23222* (2013.01); *H04N 5/44* (2013.01); *G03B 17/18* (2013.01)

(56) References Cited

FOREIGN PATENT DOCUMENTS

| | | |
|---|---|---|
| JP | 2011172094 A | 9/2011 |
| JP | 2012182582 A | 9/2012 |
| JP | 2013042255 A | 2/2013 |
| JP | 2013-183306 A | 9/2013 |

\* cited by examiner

IMAGING APPARATUS, IMAGING SYSTEM, IMAGING METHOD, AND COMPUTER-READABLE RECORDING MEDIUM

CROSS REFERENCES TO RELATED APPLICATIONS

This application is a continuation of PCT international application Ser. No. PCT/JP2014/064503 filed on May 30, 2014 which designates the United States, incorporated herein by reference, and which claims the benefit of priority from Japanese Patent Application No. 2013-238313, filed on Nov. 18, 2013, incorporated herein by reference.

BACKGROUND

1. Technical Field

The present invention relates to an imaging apparatus that captures an image of a subject, an imaging system including the imaging apparatus, an imaging method performed by the imaging apparatus, and a computer-readable recording medium.

2. Related Art

In recent years, for imaging apparatuses, such as digital cameras and digital video cameras, a technique of displaying, on a display unit, a live view image corresponding to image data generated by imaging and of sequentially transmitting the image data to an external communication device, such as a mobile phone, by using a communication technique, has been known (see Japanese Patent Application Laid-open No. 2003-250079).

The technique is a technique of remotely operating an imaging apparatus by a communication device.

Specifically, according to the technique, the communication device sequentially receives the image data transmitted from the imaging apparatus and sequentially displays the live view image corresponding to the image data on the display unit. While checking the live view image displayed on the display unit of the communication device, a user of the communication device carries out a predetermined operation on the communication device at a timing at which recording of image data is desired to be executed by the imaging apparatus. By this operation, a recording request for image data is transmitted from the communication device to the imaging apparatus, and after receiving the recording request, the imaging apparatus performs imaging operations (operations for recording image data).

SUMMARY

In accordance with some embodiments, an imaging apparatus, an imaging system, an imaging method, and a computer-readable recording medium are presented.

In some embodiments, an imaging apparatus that images a subject is presented. The imaging apparatus includes: an imaging unit that images the subject to generate image data; a first display unit; a first communication unit that connects to an external communication device to transmit and receive information to and from the communication device; a first communication control unit that transmits the image data generated by the imaging unit to the communication device and receives action instruction information related to an action instruction for a user of the imaging apparatus from the communication device, via the first communication unit; a pseudo image generating unit that generates, when the action instruction information is received via the first communication unit, a pseudo image simulatively expressing an action by the user of the imaging apparatus according to the action instruction based on the action instruction information; a first display control unit that causes the first display unit to display the pseudo image generated by the pseudo image generating unit; a position acquiring unit that acquires position information related to a position of the imaging apparatus; and a first orientation acquiring unit that acquires first orientation information related to an orientation imaged by the imaging apparatus. The action instruction information includes angle change instruction information related to an angle change instruction for instructing change of a camera angle of the imaging apparatus with respect to the subject and shooting instruction information related to a shooting instruction for instructing shooting at a particular location. The pseudo image generating unit generates, based on the position information and the first orientation information respectively acquired by the position acquiring unit and the first orientation acquiring unit upon receipt of the shooting instruction information via the first communication unit, as well as on the shooting instruction information, a first pseudo image for guiding the user of the imaging apparatus to the particular location based on the shooting instruction information, and generates, based on the angle change instruction information, a second pseudo image for causing the user of the imaging apparatus to change the camera angle of the imaging apparatus.

In some embodiments, an imaging system includes: the imaging apparatus; and the communication device that connects to the imaging apparatus to transmit and receive information to and from the imaging apparatus. the communication device includes: a second operation receiving unit that receives a second operation related to the action instruction for the user of the imaging apparatus; a second communication unit that connects to the imaging apparatus to transmit and receive information to and from the imaging apparatus; a second communication control unit that transmits the action instruction information related to the action instruction to the imaging apparatus via the second communication unit.

In some embodiments, an imaging system includes: an imaging apparatus that images a subject; and a communication device that connects to the imaging apparatus to transmit and receive information to and from the imaging apparatus. The communication device includes: a second communication unit that connects to the imaging apparatus to transmit and receive information to and from the imaging apparatus; a second communication control unit that receives image data imaged by the imaging apparatus from the imaging apparatus and transmits a pseudo image simulatively expressing an action by a user of the imaging apparatus, via the second communication unit; a second display unit; a second display control unit that causes the second display unit to display an image corresponding to the image data received via the second communication unit; a second operation receiving unit that receives a second operation related to an action instruction for the user of the imaging apparatus; a pseudo image generating unit that generates the pseudo image according to the action instruction when the second operation receiving unit receives the second operation; and a second orientation acquiring unit that acquires second orientation information related to an orientation of the communication device. The action instruction includes an angle change instruction for instructing change of a camera angle of the imaging apparatus with respect to the subject. The second operation receiving unit receives change of the orientation of the communication device based on the second orientation information acquired by the second orientation acquiring unit as the second operation related to the angle change instruction. The imaging apparatus includes: an imaging unit that images the subject to generate the image data; a first display unit; a first communication unit that connects to the communication device to transmit and receive information to and from the communication device; a first communication control unit that transmits the image data generated by the imaging unit to the communication device and receives the pseudo image from the communication device, via the first communication unit; and a first display control unit that causes the first display unit to display the pseudo image when the pseudo image is received via the first communication unit.

In some embodiments, an imaging method executed by an imaging apparatus that images a subject is presented. The imaging method includes: imaging the subject to generate image data; transmitting the image data to an external communication device, and receiving action instruction information related to an action instruction for a user of the imaging apparatus from the communication device; generating a pseudo image simulatively expressing an action by the user of the imaging apparatus according to the action instruction based on the action instruction information; displaying the pseudo image; acquiring position information related to a position of the imaging apparatus; and acquiring first orientation information related to an orientation imaged by the imaging apparatus. The action instruction information includes angle change instruction information related to an angle change instruction for instructing change of a camera angle of the imaging apparatus with respect to the subject and shooting instruction information related to a shooting instruction for instructing shooting at a particular location. In the generating, a first pseudo image for guiding the user of the imaging apparatus to the particular location based on the shooting instruction information is generated based on the position information and the first orientation information respectively acquired upon receipt of the shooting instruction information, as well as on the shooting instruction, and a second pseudo image for causing the user of the imaging apparatus to change the camera angle of the imaging apparatus is generated based on the angle change instruction.

In some embodiments, a non-transitory computer-readable recording medium is a recording medium with an executable program recorded therein. The program instructs a processor, which an imaging apparatus has, to execute: imaging a subject to generate image data; transmitting the image data to an external communication device, and receiving action instruction information related to an action instruction for a user of the imaging apparatus from the communication device; generating a pseudo image simulatively expressing an action by the user of the imaging apparatus according to the action instruction based on the action instruction information; displaying the pseudo image; acquiring position information related to a position of the imaging apparatus; and acquiring first orientation information related to an orientation imaged by the imaging apparatus. The action instruction information includes angle change instruction information related to an angle change instruction for instructing change of a camera angle of the imaging apparatus with respect to the subject and shooting instruction information related to a shooting instruction for instructing shooting at a particular location. In the generating, a first pseudo image for guiding the user of the imaging apparatus to the particular location based on the shooting instruction information is generated based on the position information and the first orientation information respectively acquired upon receipt of the shooting instruction information, as well as on the shooting instruction, and a second pseudo image for causing the user of the imaging apparatus to change the camera angle of the imaging apparatus is generated based on the angle change instruction.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is operated;

DETAILED DESCRIPTION

Hereinafter, with reference to the drawings, modes for carrying out the present invention (hereinafter, referred to as "embodiments") will be described. The present invention is not limited by the embodiments described below. Further, in describing the drawings, the same reference signs are appended to the same portions.

First Embodiment

Schematic Configuration of Imaging System

Figure 1:
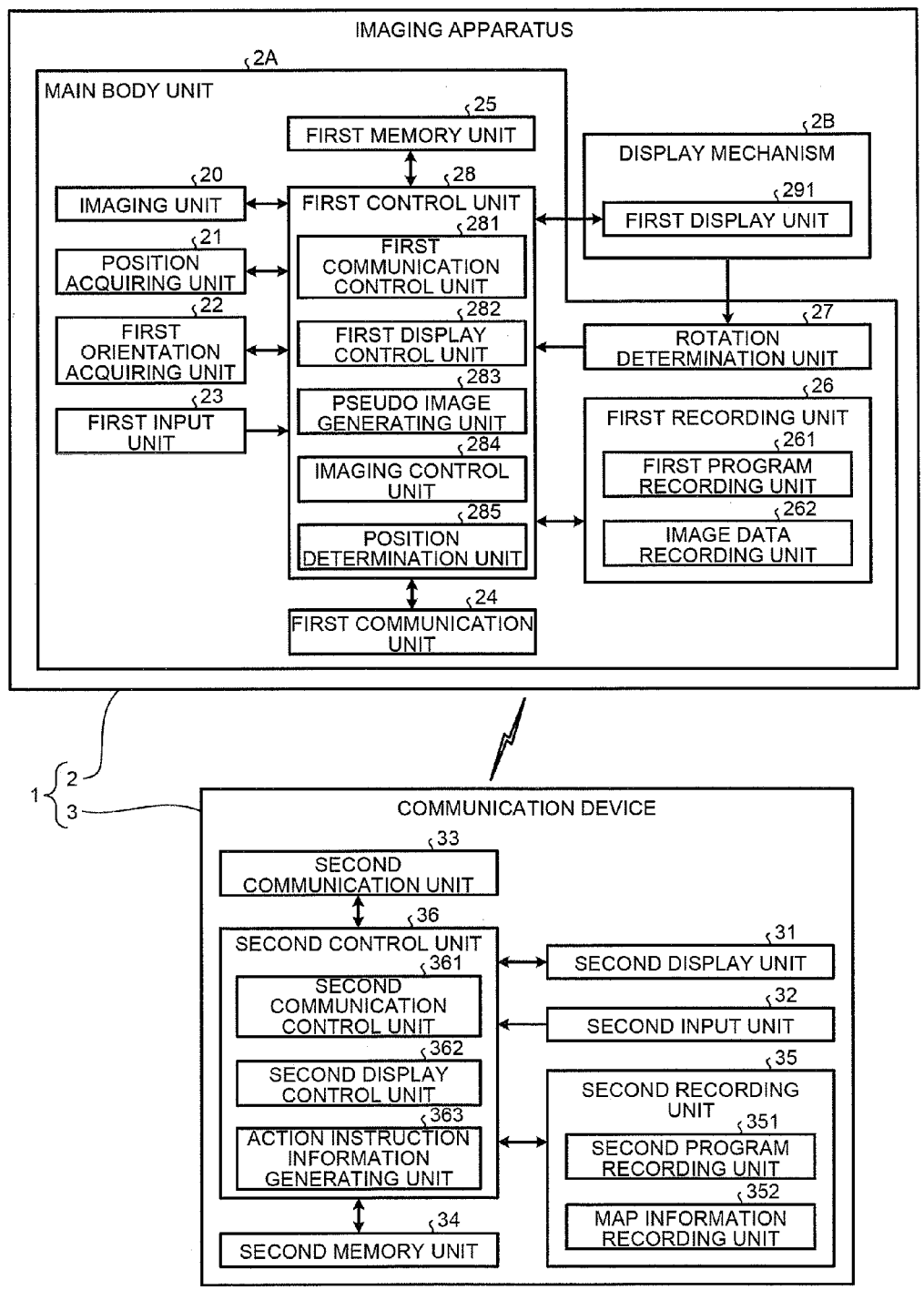
FIG. 1 is a block diagram illustrating a configuration of an imaging system according to a first embodiment of the present invention.

FIG. 1 is a block diagram illustrating a configuration of an imaging system 1 according to a first embodiment of the present invention.

The imaging system 1 includes an imaging apparatus 2 (FIG. 1) and a communication device 3 (FIG. 1), which are respectively operated by users different from each other and are connected to be able to transmit and receive information to and from each other by wireless communication.

Not being limited to the wireless communication, the imaging system 1 may be configured by connecting the imaging apparatus 2 and communication device 3 such that transmission and reception of information are possible between each other by wire communication.

The imaging system 1 is a system, in which, by the user of the communication device 3 performing on the communication device 3 an operation related to an action instruction (advice) for the user of the imaging apparatus 2, the imaging apparatus 2, which is at a location remote from the communication device 3, performs predetermined display to prompt the user of the imaging apparatus 2 to perform an action according to the advice.

Configuration of Imaging Apparatus

Figure 2:
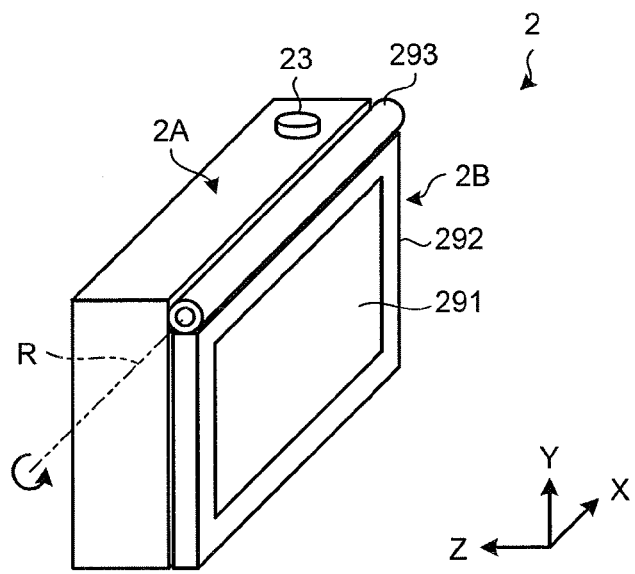
FIG. 2 is a perspective diagram of a state in which a first display unit in an imaging apparatus illustrated in FIG. 1 is positioned at a reference position, the state being viewed from a user facing side of the imaging apparatus.
Figure 3:
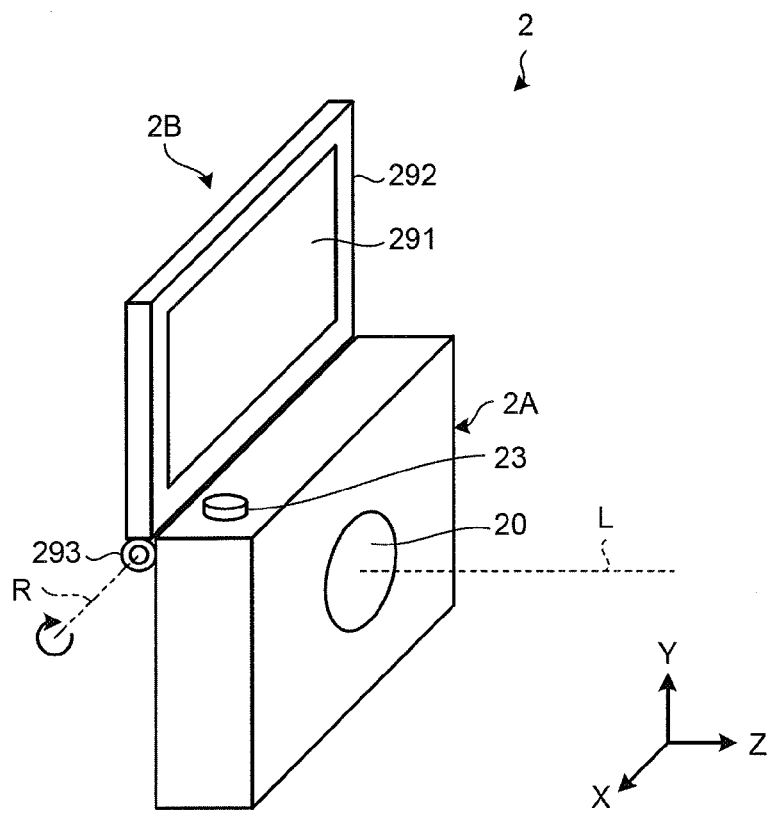
FIG. 3 is a perspective diagram of a state in which the first display unit in the imaging apparatus illustrated in FIG. 1 is positioned at a self shooting position, the state being viewed from a subject side of the imaging apparatus.

FIG. 2 is a perspective diagram of a state in which a first display unit 291 in the imaging apparatus 2 is positioned at a reference position, the state being viewed from a user facing side of the imaging apparatus 2. FIG. 3 is a perspective diagram of a state in which the first display unit 291 in the imaging apparatus 2 is positioned at a self shooting position, the state being viewed from a subject side of the imaging apparatus 2.

In FIG. 2 and FIG. 3, a width direction of the imaging apparatus 2 corresponds to an X-axis, a height direction of the imaging apparatus 2 corresponds to a Y-axis, and an optical axis L direction of the imaging apparatus 2 corresponds to a Z-axis.

The imaging apparatus 2 is an apparatus that captures an image of a subject, and, for example, is configured as: an electronic device, such as a mobile phone or tablet mobile device, which has an imaging function; an endoscope; a microscope; or the like.

Hereinafter, main parts of the present invention will be mainly described, as a configuration of the imaging apparatus 2.

This imaging apparatus 2 includes, as illustrated in FIG. 1 to FIG. 3, a main body unit 2A and a display mechanism 2B.

The main body unit 2A includes, as illustrated in FIG. 1, an imaging unit 20, a position acquiring unit 21, a first orientation acquiring unit 22, a first input unit 23, a first communication unit 24, a first memory unit 25, a first recording unit 26, a rotation determination unit 27, and a first control unit 28.

Under control by the first control unit 28, the imaging unit 20 images a subject and generates image data. This imaging unit 20 is configured by using: an optical system, which forms a subject image; an imaging element, such as a charge coupled device (CCD), which optically receives the subject image formed by the optical system; a signal processing unit, which generates digital image data by performing signal processing (A/D conversion or the like) on an electric signal (analog signal) from the imaging element; and the like.

The image data generated by the imaging unit 20 are then, under control by the first control unit 28, sequentially stored in the first memory unit 25 and recorded, according to a shooting operation on the first input unit 23 by the user of the imaging apparatus 2, into the first recording unit 26.

The position acquiring unit 21 receives orbital information of satellites transmitted from a plurality of GPS satellites forming a global positioning system (GPS), which is a measuring means for measuring a position of an object on earth, and the position acquiring unit 21 acquires, based on this received orbital information, position information (information related to longitude and latitude) of the imaging apparatus 2. The position acquiring unit 21 then outputs the position information of the imaging apparatus 2 to the first control unit 28.

The first orientation acquiring unit 22 acquires first orientation information, which is an orientation of the imaging apparatus 2, where, when the optical axis L (FIG. 3) of the imaging apparatus 2 (the optical system in the imaging unit 20) is approximately horizontal, a direction of the optical axis L directed to a field area is defined as a reference orientation. The first orientation acquiring unit 22 then outputs the first orientation information of the imaging apparatus 2 to the first control unit 28.

Specifically, the first orientation acquiring unit 22 is configured by using a magnetic orientation sensor or the like, and acquires the first orientation information of the imaging apparatus 2 by detecting components of earth magnetism in a vertical direction and a horizontal direction and detecting an azimuth angle, which is an angle formed by a reference orientation with reference the north and the optical axis L of the imaging apparatus 2.

The first input unit 23 is configured by using a button, a switch, or the like, which receives a user operation (see FIG. 2 and FIG. 3), and outputs an instruction signal corresponding to the user operation to the first control unit 28.

The first communication unit 24 performs, under control by the first control unit 28, wireless communication of various data including live view image data and signals required in the communication, with the communication device 3, according to a predetermined protocol.

The first memory unit 25 stores therein the image data generated by the imaging unit 20, action instruction information received via the first communication unit 24 from the communication device 3, and the like.

The first recording unit 26 includes, as illustrated in FIG. 1, a first program recording unit 261 and an image data recording unit 262.

The first program recording unit 261 records therein various programs (including an imaging program) executed by the first control unit 28, various data used during the execution of the programs, and the like.

The image data recording unit 262 records therein, under control by the first control unit 28, the image data generated by the imaging unit 20.

The rotation determination unit 27 determines a rotational state of the display mechanism 2B and outputs a result of this determination to the first control unit 28. Specifically, the rotation determination unit 27 determines whether or not the first display unit 291 is positioned at the self shooting position (FIG. 3) and outputs a result of this determination to the first control unit 28.

The first control unit 28 is configured by using a central processing unit (CPU) and comprehensively controls operations of the imaging apparatus 2 by performing transfer or like of instructions and data corresponding to respective units forming the imaging apparatus 2, according to instruction signals and the like from the first input unit 23.

This first control unit 28 includes, as illustrated in FIG. 1, a first communication control unit 281, a first display control unit 282, a pseudo image generating unit 283, an imaging control unit 284, and a position determination unit 285.

The first communication control unit 281 controls operations of the first communication unit 24 and performs wireless communication with the communication device 3.

Specifically, the first communication control unit 281 sequentially transmits to the communication device 3, via the first communication unit 24, the live view image data successively generated by the imaging unit 20 and sequentially stored in the first memory unit 25. Further, the first communication control unit 281 transmits the position information and first orientation information respectively acquired by the position acquiring unit 21 and first orientation acquiring unit 22, to the communication device 3, via the first communication unit 24, according to an operation (hereinafter, referred to as "advice request operation") on the first input unit 23 by the user of the imaging apparatus 2, the operation being for receiving advice on a shooting spot, that is, based on an instruction signal from the first input unit 23. Further, the first communication control unit 281 receives, via the first communication unit 24, the action instruction information from the communication device 3.

The first display control unit 282 controls operations of the first display unit 291 forming the display mechanism 2B and causes the first display unit 291 to display an image.

Specifically, the first display control unit 282 reads the live view image data stored in the first memory unit 25 and causes the first display unit 291 to display (perform live view display of) a live view image corresponding to the live view image data. Further, the first display control unit 282 causes the first display unit 291 to display a superimposed image, which is the live view image that has been superimposed with a pseudo image generated by the pseudo image generating unit 283. Further, the first display control unit 282 reads the image data recorded in the image data recording unit 262 and causes the first display unit 291 to display an image corresponding to the image data.

If the rotation determination unit 27 determines that the first display unit 291 is positioned at the self shooting position (FIG. 3), the first display control unit 282 inverts the image to be displayed with respect to the main body unit 2A and causes the first display unit 291 to perform display (mirror inverted display) thereof.

After inverting the image to be displayed with respect to the main body unit 2A, the first display control unit 282 may further invert the image horizontally and cause the first display unit 291 to perform display thereof. Further, without inverting the image to be displayed, the first display control unit 282 may cause the first display unit 291 to display the image as it is.

When the pseudo image generating unit 283 receives action instruction information via the first communication unit 24, the pseudo image generating unit 283 generates a pseudo image simulatively expressing an action by the user of the imaging apparatus 2 according to an action instruction that is based on the action instruction information.

In this first embodiment, the action instruction information is shooting instruction information related to a shooting instruction (advice on a shooting spot) for instructing shooting at a particular location.

The pseudo image generating unit 283 generates, based on the position information and first orientation information respectively acquired by the position acquiring unit 21 and first orientation acquiring unit 22 upon receipt of the shooting instruction information, as well as on the shooting instruction information, a pseudo image (hereinafter, referred to as "first pseudo image") for guiding the user of the imaging apparatus 2 to the shooting spot that is based on the shooting instruction information.

The imaging control unit 284 causes the imaging unit 20 to image the subject according to a shooting operation on the first input unit 23 by the user of the imaging apparatus 2 and records image data generated in the imaging unit 20 by the imaging into the image data recording unit 262.

The position determination unit 285 determines, based on the shooting instruction information stored in the first memory unit 25 and the position information acquired by the position acquiring unit 21, whether or not a current position of the imaging apparatus 2 is positioned within a specified distance from the shooting spot (target position) that is based on the shooting instruction information.

As illustrated in FIG. 2 or FIG. 3, the display mechanism 2B is provided rotatably with respect to the main body unit 2A and is positioned at the reference position (FIG. 2) at a user side (back side) of the imaging apparatus 2 or at the self shooting position (FIG. 3) at a subject side (front side) thereof.

As illustrated in FIG. 1 to FIG. 3, this display mechanism 2B includes the first display unit 291, a movable portion 292 (FIG. 2 and FIG. 3) and a rotation support portion 293 (FIG. 2 and FIG. 3).

The first display unit 291 is configured by using a display panel made of a liquid crystal, organic electroluminescence (EL), or the like, and under control by the first display control unit 282, displays the live view image or the first superimposed image. Further, the first display unit 291 displays, as appropriate, information related to operation information and shooting of the imaging apparatus 2, and the like.

The movable portion 292 is attached with the first display unit 291, and is attached to the main body unit 2A rotatably, via the rotation support portion 293, such as a hinge, around one end of the main body unit 2A.

Specifically, the movable portion 292 is attached to the main body unit 2A rotatably around an axis R of the rotation support portion 293, such that the first display unit 291 is positioned at the reference position (FIG. 2) or self shooting position (FIG. 3).

Configuration of Communication Device

The communication device 3 is a device that performs wireless communication with the imaging apparatus 2 and is configured, for example, as a digital camera, a digital video camera, a mobile phone, a tablet mobile device, a personal computer, or the like.

Hereinafter, main parts of the present invention will be mainly described, as a configuration of the communication device 3.

As illustrated in FIG. 1, this communication device 3 includes a second display unit 31, a second input unit 32, a second communication unit 33, a second memory unit 34, a second recording unit 35, and a second control unit 36.

The second display unit 31 is configured by using a display panel made of a liquid crystal, organic EL, or the like, and under control by the second control unit 36, displays various images.

The second input unit 32 is configured by using a button, a switch, a touch panel, a microphone, or the like.

That is, the second input unit (button or switch) 32 receives a user operation by the user of the communication device 3 and outputs an instruction signal corresponding to the user operation to the second control unit 36. Further, the second input unit (touch panel) 32 detects a touch by an external object and outputs a position signal corresponding to a position of the detected touch to the second control unit 36. Furthermore, the second input unit (microphone or like) 32 inputs therein a word (voice) said by the user of the communication device 3, converts it to an electric signal, and performs A/D conversion by sampling and quantization of the converted electric signal, to thereby generate voice data and output the voice data to the second control unit 36.

The second input unit 32 has a function as a second operation receiving unit according to the present invention.

Under control by the second control unit 36, the second communication unit 33 performs, with the imaging apparatus 2, wireless communication of various data including the live view image data and signals required in the communication, according to a predetermined protocol.

The second memory unit 34 stores therein the live view image data transmitted from the imaging apparatus 2 and received via the second communication unit 33, the position information and first orientation information, and the like.

The second recording unit 35 includes a second program recording unit 351 and a map information recording unit 352, as illustrated in FIG. 1.

The second program recording unit 351 records therein various programs executed by the second control unit 36, various data used during the execution of the programs, and the like.

The map information recording unit 352 records therein map information including a longitude and a latitude of each point.

The second control unit 36 is configured by using a CPU or the like, and comprehensively controls operations of the communication device 3 by performing transfer or like of instructions and data corresponding to respective units forming the communication device 3, according to an instruction signal, a position signal, voice data, or the like from the second input unit 32.

This second control unit 36 includes a second communication control unit 361, a second display control unit 362, and an action instruction information generating unit 363, as illustrated in FIG. 1.

The second communication control unit 361 controls operations of the second communication unit 33 and performs wireless communication with the imaging apparatus 2.

Specifically, via the second communication unit 33, the second communication control unit 361 sequentially receives live view image data from the imaging apparatus 2 and transmits action instruction information generated by the action instruction information generating unit 363 to the imaging apparatus 2.

The second display control unit 362 causes the second display unit 31 to display various images (for example, live view images corresponding to the live view image data received via the second communication unit 33).

The action instruction information generating unit 363 generates, according to an operation related to an action instruction on the second input unit 32 by the user of the communication device 3, that is, based on the instruction signal, position signal, or voice data from the second input unit 32, action instruction information related to an action instruction to the user of the imaging apparatus 2.

In this first embodiment, the action instruction information generating unit 363 generates, according to an operation (hereinafter, referred to as "first advice operation") related to a shooting instruction (advice on a shooting spot) onto the second input unit 32 by the user of the communication device 3, shooting instruction information (information related to a longitude and a latitude of the shooting spot (target position)) related to the shooting instruction.

The above described first advice operation corresponds to a second operation according to the present invention.

Operations of Imaging System

Next, operations of the imaging system 1 will be described.

Hereinafter, as the operations of the imaging system 1, operations of the imaging apparatus 2 (an imaging method according to the present invention) and operations of the communication device 3 will be described in order.

Operations of Imaging Apparatus

Figure 4:
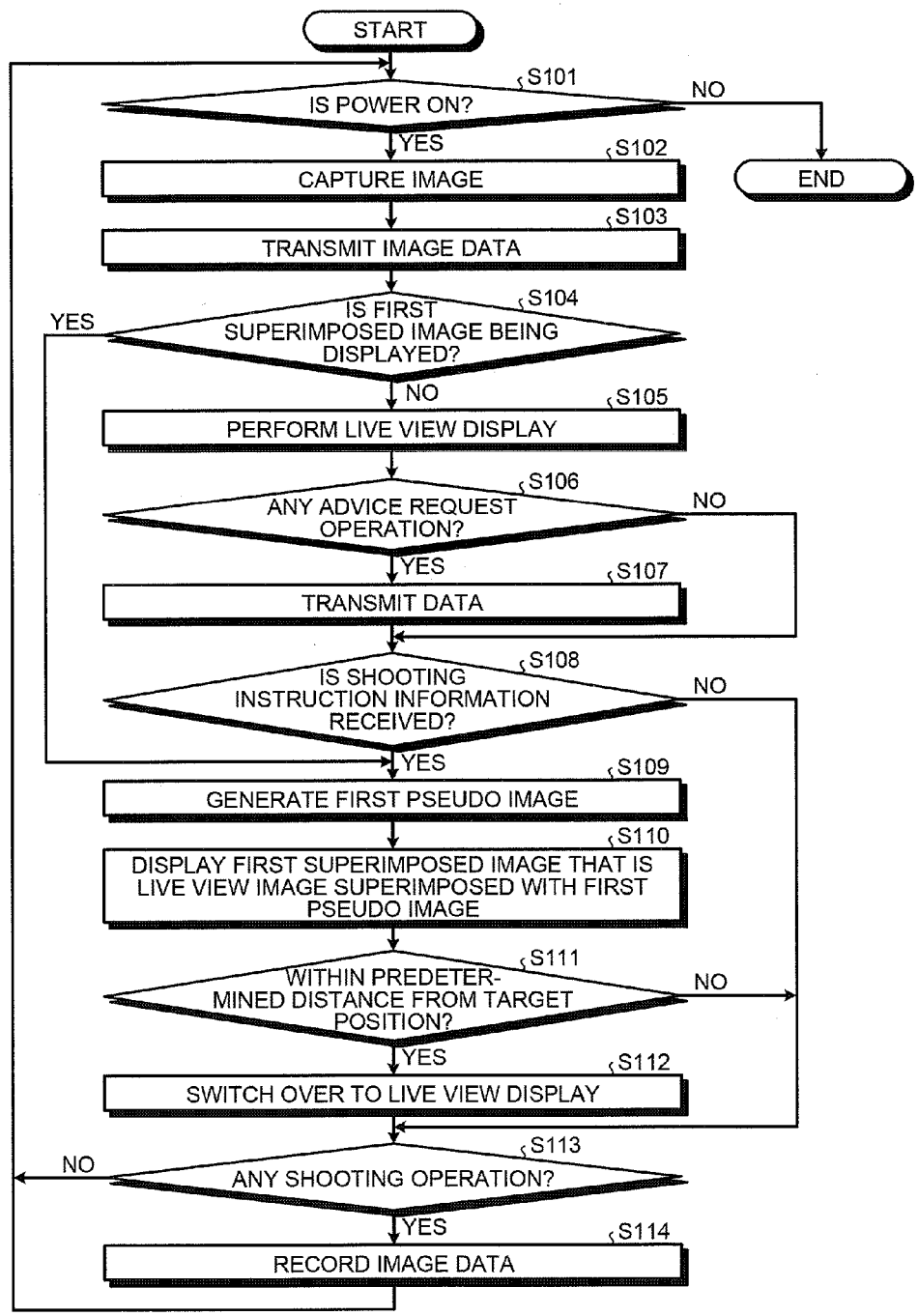
FIG. 4 is a flow chart illustrating operations of the imaging apparatus illustrated in FIG. 1 to FIG. 3.

FIG. 4 is a flow chart illustrating the operations of the imaging apparatus 2.

If power of the imaging apparatus 2 is turned ON by an operation onto the first input unit 23 by the user of the imaging apparatus 2 (step S101: Yes), the first control unit 28 causes the imaging unit 20 to start imaging (step S102: imaging step). Image data generated by the imaging unit 20 are sequentially stored in the first memory unit 25.

Subsequently, the first communication control unit 281 sequentially transmits, via the first communication unit 24, the latest live view image data stored in the first memory unit 25 to the communication device 3 (step S103: communicating step).

Subsequently, the first control unit 28 determines whether or not display of a first superimposed image has been started in a later described step S110 and the first superimposed image is being displayed (step S104).

If it is determined that the first superimposed image is being displayed (step S104: Yes), the imaging apparatus 2 proceeds to step S109.

On the contrary, if it is determined that the first superimposed image is not being displayed (step S104: No), the first display control unit 282 reads the latest live view image data stored in the first memory unit 25 and causes the first display unit 291 to start live view display (step S105).

After step S105, the first communication control unit 281 determines whether or not there has been any advice request operation onto the first input unit 23 by the user of the imaging apparatus 2 (step S106).

If the first communication control unit 281 determines that there has been an advice request operation (step S106: Yes), the first communication control unit 281 transmits, via the first communication unit 24, the position information and first orientation information, which were respectively acquired by the position acquiring unit and first orientation acquiring unit when the operation was performed (step S107).

On the contrary, if it is determined that there has not been any advice request operation (step S106: No), the imaging apparatus 2 proceeds to step S108.

After step S107, or if it is determined that there has not been any advice request operation (step S106: No), the first communication control unit 281 determines whether or not shooting instruction information (information related to a longitude and a latitude of a shooting spot (target position)) has been received from the communication device 3 via the first communication unit 24 (step S108: communicating step).

If it is determined that shooting instruction information has not been received (step S108: No), the imaging apparatus 2 proceeds to step S113.

On the contrary, if it is determined that shooting instruction information has been received (step S108: Yes), the first control unit 28 stores the shooting instruction information in the first memory unit 25. The pseudo image generating unit 283 generates a first pseudo image (step S109: pseudo image generating step). If it is determined that the first superimposed image is being displayed (step S104: Yes), the pseudo image generating unit 283 also generates the first pseudo image in step S109.

After step S109, the first display control unit 282 causes the first display unit 291 to display a first superimposed image, which is the live view image corresponding to the latest live view image data stored in the first memory unit 25, the live view image having been superimposed with the first pseudo image generated in step S109 (step S110: displaying step).

Subsequently, based on the shooting instruction information stored in the first memory unit 25 and the position information acquired by the position acquiring unit 21, the position determination unit 285 determines whether or not a current position of the imaging apparatus 2 is positioned within a specified distance from a target position (position of the shooting spot) that is based on the shooting instruction information (step S111).

If it is determined that the current position of the imaging apparatus 2 is not positioned within the specified distance from the target position (step S111: No), the imaging apparatus 2 proceeds to step S113.

On the contrary, if the current position of the imaging apparatus 2 is determined to be positioned within the specified distance from the target position (step S111: Yes), the first display control unit 282 switches over a display state of the first display unit 291 from display of the first superimposed image to live view display (step S112).

After step S112, if it is determined that shooting instruction information has not been received in step S108 (step S108: No), or if it is determined that the current position of the imaging apparatus 2 is not positioned within the specified distance from the target position (step S111: No), the imaging control unit 284 determines whether or not there has been any shooting operation onto the first input unit 23 by the user of the imaging apparatus 2 (step S113).

If it is determined that there has not been any shooting operation (step S113: No), the imaging apparatus 2 returns to step S101.

On the contrary, if it is determined that there has been a shooting operation (step S113: Yes), the imaging control unit 284 causes the imaging unit 20 to image a subject, and records image data generated by the imaging unit by the imaging into the image data recording unit 262 (step S114). Thereafter, the imaging apparatus 2 returns to step S101.

Operations of Communication Device

Figure 5:
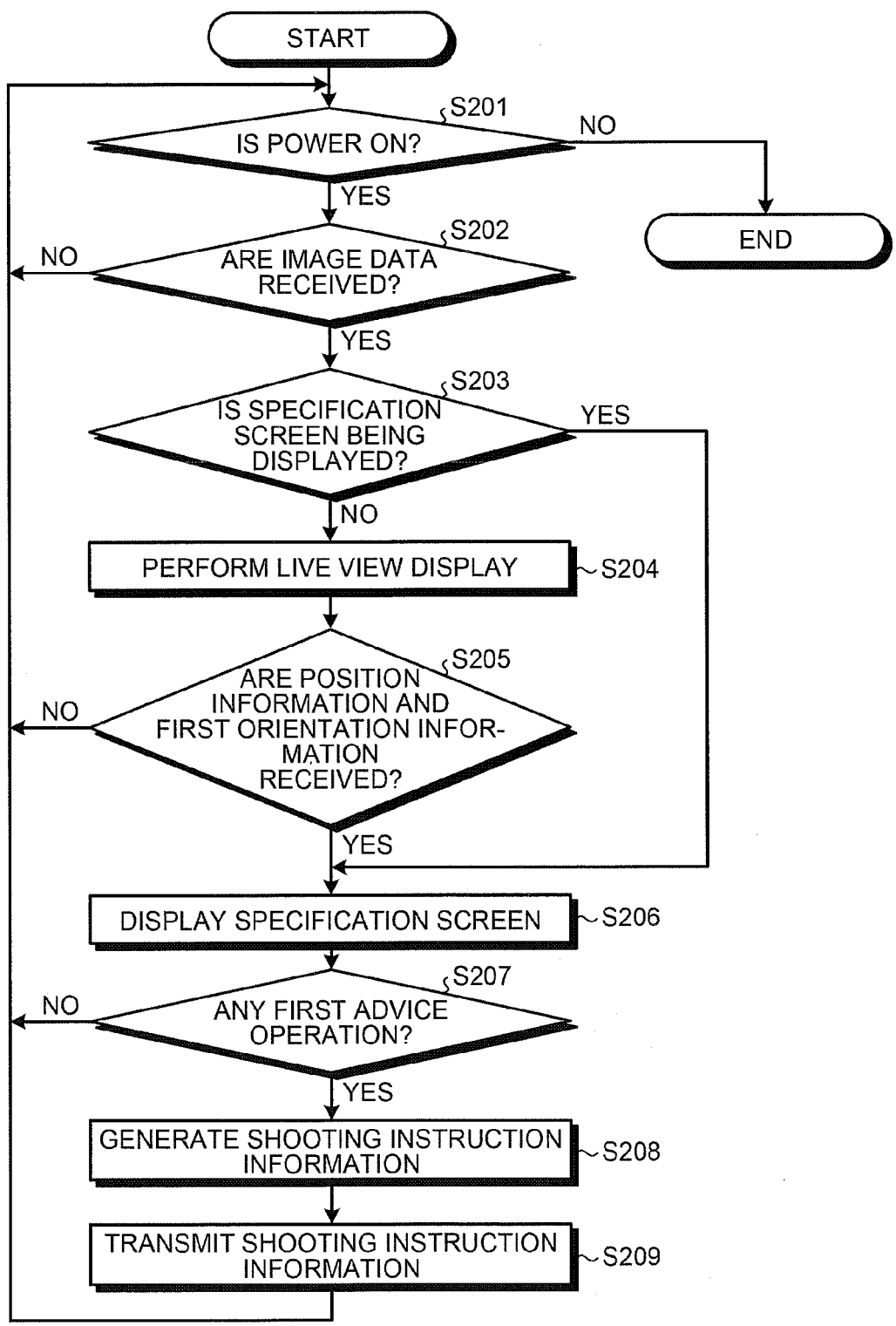
FIG. 5 is a flow chart illustrating operations of a communication device illustrated in FIG. 1.

FIG. 5 is a flow chart illustrating the operations of the communication device 3.

When power of the communication device 3 is turned ON by an operation by the user of the communication device 3 onto the second input unit 32 (step S201: Yes), the second communication control unit 361 determines whether or not live view image data have been received from the imaging apparatus 2 via the second communication unit 33 (step S202).

If it is determined that the live view image data have not been received (step S202: No), the communication device 3 returns to step S201.

On the contrary, if it is determined that the live view image data have been received (step S202: Yes), the second control unit 36 sequentially stores the received live view image data into the second memory unit 34. Further, the second control unit 36 determines whether or not displaying a specification screen has been started in a later described step S206 and the specification screen is being displayed (step S203).

If it is determined that the specification screen is being displayed (step S203: Yes), the communication device 3 proceeds to step S206.

On the contrary, if it is determined that the specification screen is not being displayed (step S203: No), the second display control unit 362 sequentially reads out the live view image data stored in the second memory unit 34 and causes the second display unit 31 to display (perform live view display of) live view images corresponding to the live view image data (step S204).

Subsequently, the second communication control unit 361 determines whether or not the position information and first orientation information of the imaging apparatus 2 have been received from the imaging apparatus 2 via the second communication unit 33 (step S205).

If it is determined that the position information and first orientation information of the imaging apparatus 2 have not been received (step S205: No), the communication device 3 returns to step S201.

On the contrary, if it is determined that the position information and first orientation information of the imaging apparatus 2 have been received (step S205: Yes), the second display control unit 362 causes the second display unit 31 to display a specification screen for giving advice on a shooting spot to the user of the imaging apparatus 2 (step S206). If it is determined that the specification screen is being displayed (Step S203: Yes), the second display control unit 362 also causes the second display unit 31 to display the specification screen.

Subsequently, the action instruction information generating unit 363 determines whether or not there has been any first advice operation onto the second input unit 32 by the user of the communication device 3 (step S207).

If it is determined that there has not been any first advice operation (step S207: No), the communication device 3 returns to step S201.

On the contrary, if it is determined that there has been a first advice operation (step S207: Yes), the action instruction information generating unit 363 generates shooting instruction information related to a shooting instruction (step S208).

Subsequently, the second communication control unit 361 transmits, via the second communication unit 33, the shooting instruction information generated in step S208 to the imaging apparatus 2 (step S209). Thereafter, the communication device 3 returns to step S201.

Specific Examples of Display Modes

Specific examples of images displayed by the imaging apparatus 2 and communication device 3 when the above described imaging system 1 is operated will be described.

Hereinafter, images displayed by the imaging apparatus 2 and communication device 3 when the user of the imaging apparatus 2 performs an advice request operation and when the user of the communication device 3 performs a first advice operation will be described in order.

Advice Request Operation

Figure 6:
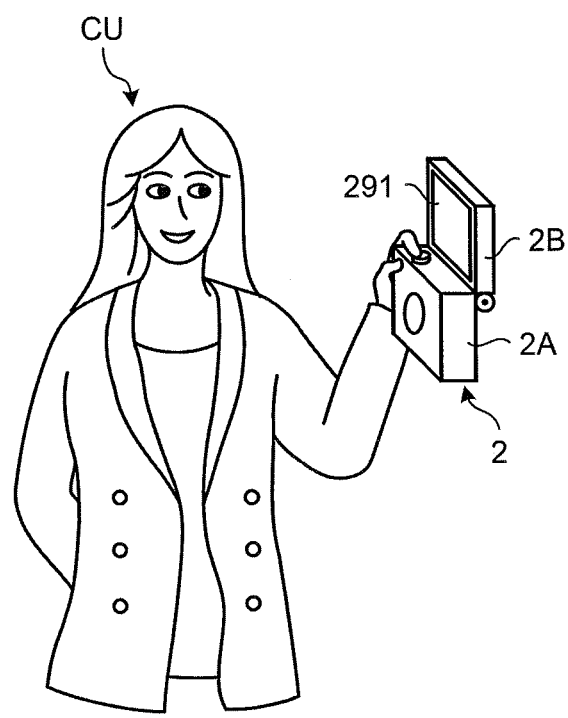
FIG. 6 is a diagram schematically illustrating a posture of a user of the imaging apparatus when the imaging system illustrated in FIG. 4
Figure 7:
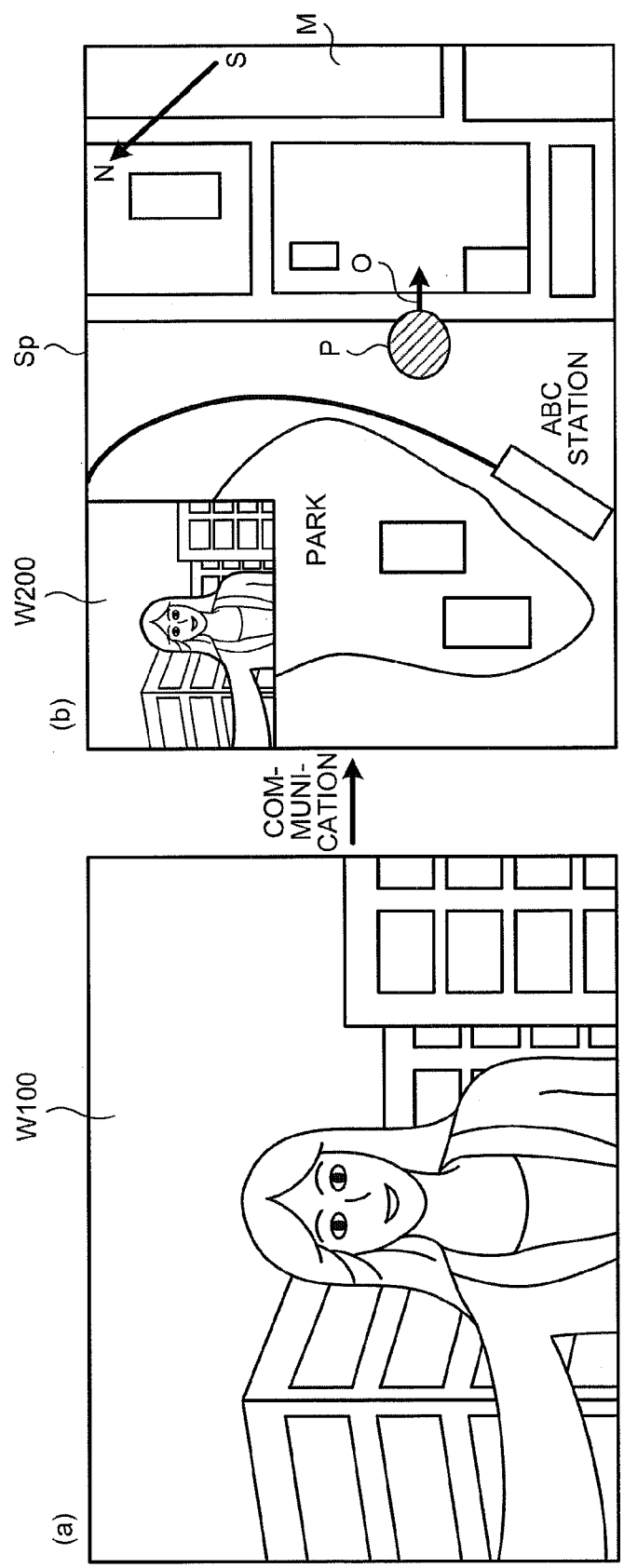
FIG. 7 is a diagram illustrating an example of images displayed by the imaging apparatus and communication device when the user of the imaging apparatus performs an advice request operation upon the operation of the imaging system illustrated in FIG. 4 and FIG. 5.

FIG. 6 is a diagram schematically illustrating a posture of the user of the imaging apparatus 2 upon the operation of the imaging system 1. FIG. 7 is a diagram illustrating an example of images displayed by the imaging apparatus 2 and communication device 3 when the user of the imaging apparatus 2 performs an advice request operation upon the operation of the imaging system 1.

Hereinafter, as illustrated in FIG. 6, an example, which is a case in which a user CU of the imaging apparatus 2 performs self shooting for shooting the user CU herself as a subject while the user CU holds the imaging apparatus 2 with her left hand with the first display unit 291 being positioned at a self shooting position, will be described.

For example, a live view image currently being displayed as the live view display in the imaging apparatus 2 (step S105), is a live view image W100 illustrated in (a) of FIG. 7.

If the user CU of the imaging apparatus 2 wants to receive advice on a shooting spot from the user of the communication device 3, she performs an advice request operation onto the first input unit 23 (for example, an operation of pressing down any button of the buttons forming the first input unit 23, or the like). Based on an instruction signal from the first input unit 23, the imaging apparatus 2 determines that there has been an advice request operation (step S106: Yes), and transmits the position information and first orientation information at the time the operation was performed to the communication device 3 (step S107).

When the communication device 3 receives the position information and first orientation information of the imaging apparatus 2 (step S205: Yes), the communication device 3 displays a specification screen Sp illustrated in (b) of FIG. 7 (step S206).

Specifically, at step S206, the second display control unit 362 reads out, from the map information recording unit 352, map information of a predetermined reduced scale including a longitude and a latitude based on the position information of the imaging apparatus 2. Further, the second display control unit 362 reads out the latest live view image stored in the second memory unit 34. The second display control unit 362 superimposes a live view image W200 corresponding to the latest live view image data, on a map image "M" corresponding to the map information, as illustrated in (b) of FIG. 7. Further, the second display control unit 362 superimposes a position image (dark circle) "P" and a first orientation image (arrow) "O" respectively indicating a position and an orientation of the imaging apparatus 2 in the map image "M", on the map image "M", based on the position information and first orientation information of the imaging apparatus 2. The second display control unit 362 causes the second display unit 31 to display the specification screen Sp, which has therein the map image "M" that has been superimposed with the live view image W200, position image "P", and first orientation image "O".

In the example of (b) of FIG. 7, the imaging apparatus 2 is held by the user CU of the imaging apparatus 2 with a posture facing in a direction (left direction) of the arrow of the first orientation image "O" at the position of the position image "P", in the map image "M". In other words, the user CU of the imaging apparatus 2 stands with a posture facing a proximal end side (a right direction) of the arrow of the first orientation image "O" at the position of a distal end side of the arrow, in the map image "M".

While sequentially transmitting the latest live view image data (step S103), the imaging apparatus 2 sequentially displays the live view image W100 corresponding to the latest live view image data (step S105). The communication device 3 sequentially displays the live view image W200 corresponding to the latest live view image data in step S204 or step S206. Therefore, as illustrated in (b) of FIG. 7, the live view image W200 displayed by the communication device 3 becomes an image that is approximately the same as the live view image W100 ((a) of FIG. 7) being displayed by the imaging apparatus 2.

First Advice Operation

The user of the communication device 3 checks the specification screen Sp displayed by the communication device 3. If the user of the communication device 3 wants to give advice on a shooting spot to the user CU of the imaging apparatus 2 (for example, like in a case in which advice on a shooting spot near the position of the user CU of the imaging apparatus 2 in the map image "M" is desired to be given), the user of the communication device 3 touches, with a finger, specified shooting spots S1 to S6 (see FIG. 8 to FIG. 13) on a display screen in the communication device 3 (the second input unit (touch panel) 32).

Hereinafter, cases in which the specified shooting spots S1 to S6 are instructed will be described in order.

When Specified Shooting Spot S1 is Instructed

Figure 8:
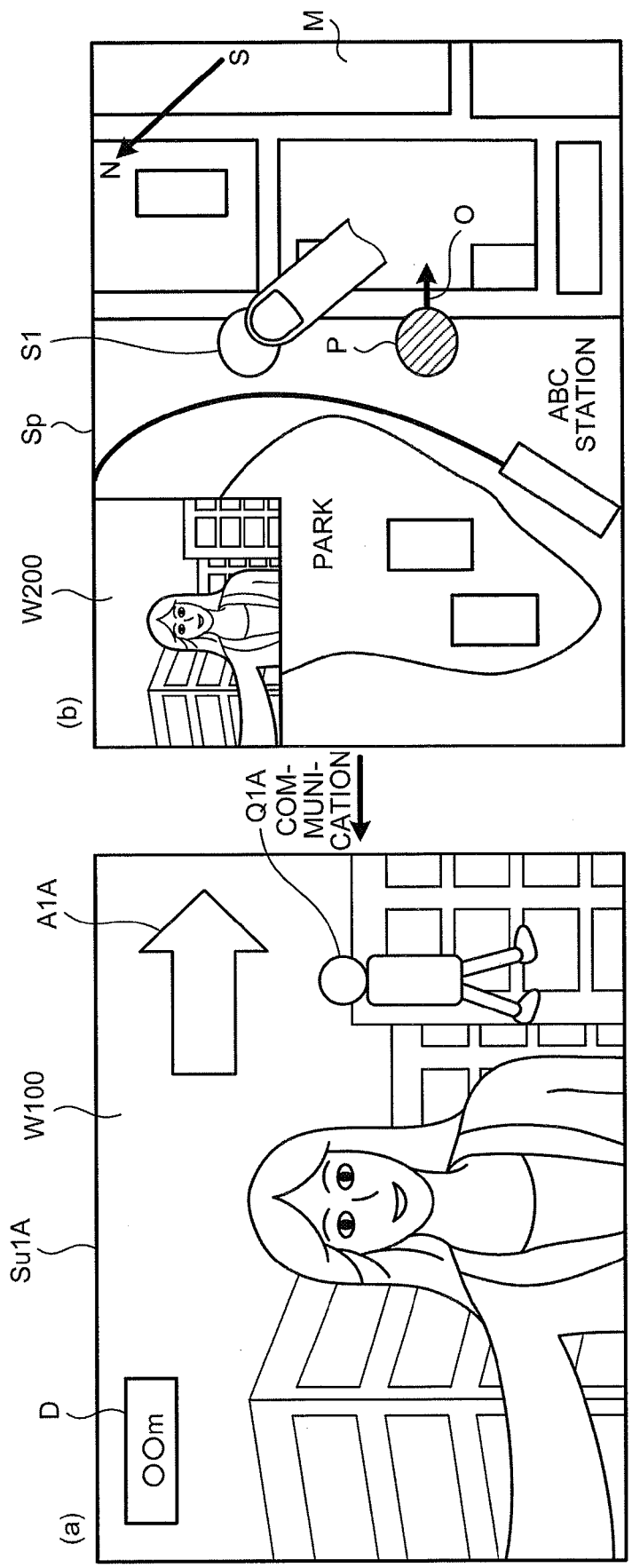
FIG. 8 is a diagram illustrating an example of a first advice operation performed by a user of the communication device and of a first superimposed image displayed by the imaging apparatus, upon the operation of the imaging system illustrated in FIG. 4 and FIG. 5.

FIG. 8 is a diagram illustrating an example of a first advice operation (instructing the specified shooting spot S1) performed by the user of the communication device 3 and of a first superimposed image displayed by the imaging apparatus 2, when the imaging system 1 is operated.

The specification screen Sp illustrated in (b) of FIG. 8 is a specification screen that is the same as the specification screen Sp illustrated in (b) of FIG. 7. The specification screens Sp illustrated in (b) of FIG. 9, (b) of FIG. 10, (b) of FIG. 11, (b) of FIG. 12, and (b) of FIG. 13 are similar thereto also.

If the specified shooting spot S1 positioned on a right side when seen from the user CU of the imaging apparatus 2 is instructed, the communication device 3 determines, based on a position signal from the second input unit (touch panel) 32, that there has been a first advice operation (step S207: Yes). The communication device 3 generates shooting instruction information (information related to a longitude and a latitude of the specified shooting spot S1 corresponding to the position touched in the map image "M") (step S208) and transmits the shooting instruction information to the imaging apparatus 2 (step S209).

When the imaging apparatus 2 receives the shooting instruction information (step S108: Yes), at step S109, the imaging apparatus 2 recognizes a positional relation between the current position and orientation of the imaging apparatus 2 and the position (target position) of the specified shooting spot S1, based on the position information and first orientation information, which were acquired respectively upon the receipt of the shooting instruction information by the position acquiring unit 21 and first orientation acquiring unit 22, as well as on the shooting instruction information. Specifically, the imaging apparatus 2 recognizes that the target position is on the right side of the user CU of the imaging apparatus 2 (on the left side of the imaging apparatus 2). In order to guide the user CU of the imaging apparatus 2 to the target position, the imaging apparatus 2 generates a first pseudo image Q1A ((a) of FIG. 8) simulatively expressing an action of a person walking to a right side (to the right side of the user CU of the imaging apparatus 2). Further, the imaging apparatus 2 generates, based on the current position of the imaging apparatus 2 and the target position, distance information (a distance image "D" ((a) of FIG. 8) related to a distance from the current position of the imaging apparatus 2 to the target position. The imaging apparatus 2 displays a first superimposed image Su1A ((a) of FIG. 8), which is the live view image W100 corresponding to the latest live view image data, the live view image W100 having been superimposed with the first pseudo image Q1A, the distance image "D", and an arrow image A1A in a right direction (step S110).

When Specified Shooting Spot S2 is Instructed

Figure 9:
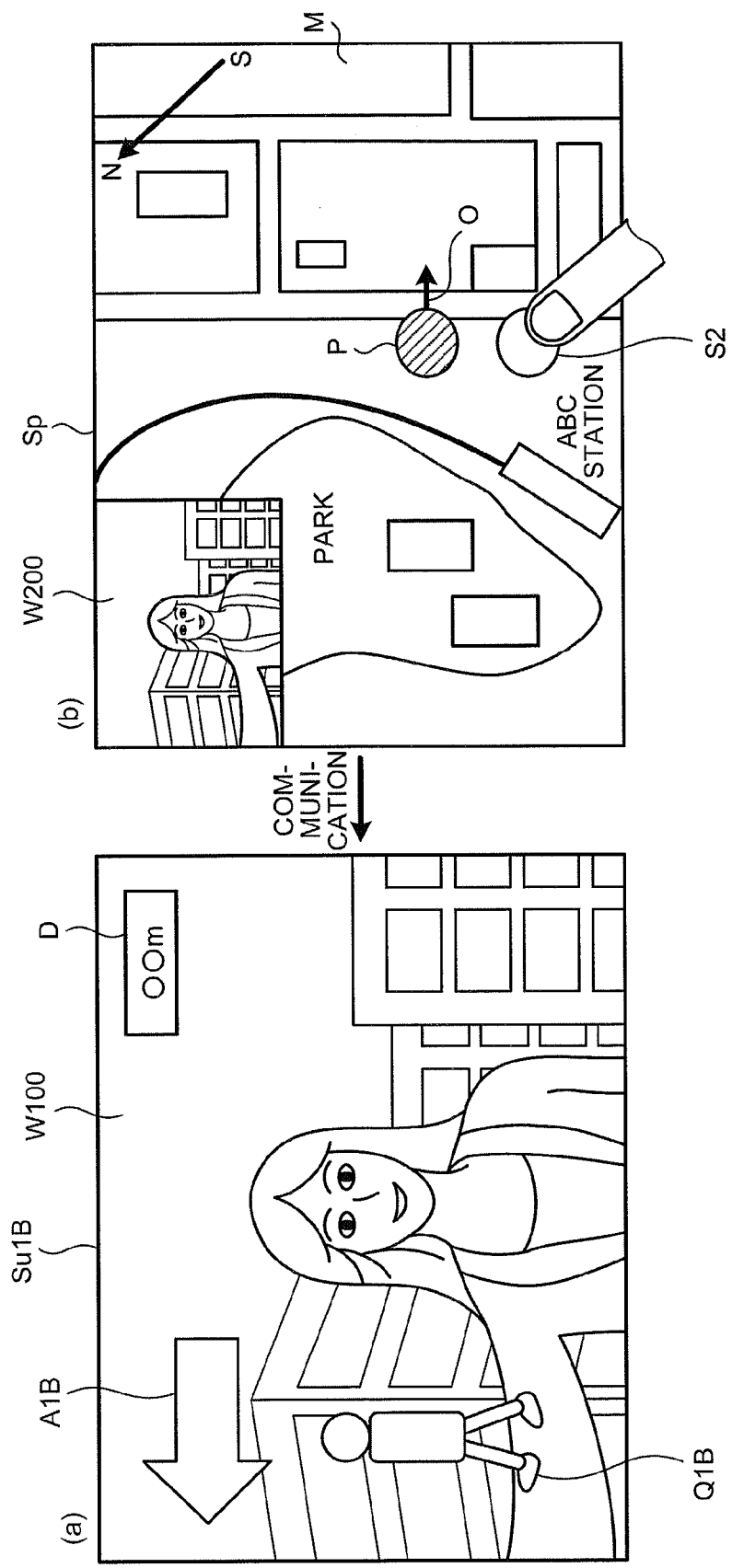
FIG. 9 is a diagram illustrating an example of the first advice operation performed by the user of the communication device and of the first superimposed image displayed by the imaging apparatus, upon the operation of the imaging system illustrated in FIG. 4 and FIG. 5.

FIG. 9 is a diagram illustrating an example of the first advice operation (instructing the specified shooting spot S2) performed by the user of the communication device 3 and of the first superimposed image displayed by the imaging apparatus 2, when the imaging system 1 is operated.

If the specified shooting spot S2, which is positioned on a left side when viewed from the user CU of the imaging apparatus 2, is instructed, the communication device 3 generates shooting instruction information including information related to a longitude and a latitude of the specified shooting spot S2 corresponding to the touched position in the map image "M" (step S208), and transmits the shooting instruction information to the imaging apparatus 2 (step S209).

When the imaging apparatus 2 receives the shooting instruction information (step S108: Yes), at step S109, the imaging apparatus 2 recognizes, by a process similar to that in the case in which the specified shooting spot S1 is instructed, that the position of the specified shooting spot S2 (target position) is on the left side of the user CU of the imaging apparatus 2. The imaging apparatus 2 then generates a first pseudo image Q1B ((a) of FIG. 9) that simulatively expresses an action of a person walking to a left side. Further, the imaging apparatus 2 generates, by a process similar to that in the case in which the specified shooting spot S1 is instructed, distance information (the distance image "D" ((a) of FIG. 9) related to a distance from the current position of the imaging apparatus 2 to the target position. The imaging apparatus 2 displays a first superimposed image Su1B ((a) of FIG. 9), which is the live view image W100 that has been superimposed with the first pseudo image Q1B, the distance image "D", and an arrow image A1B ((a) of FIG. 9) in a left direction (step S110).

When Specified Shooting Spot S3 is Instructed

Figure 10:
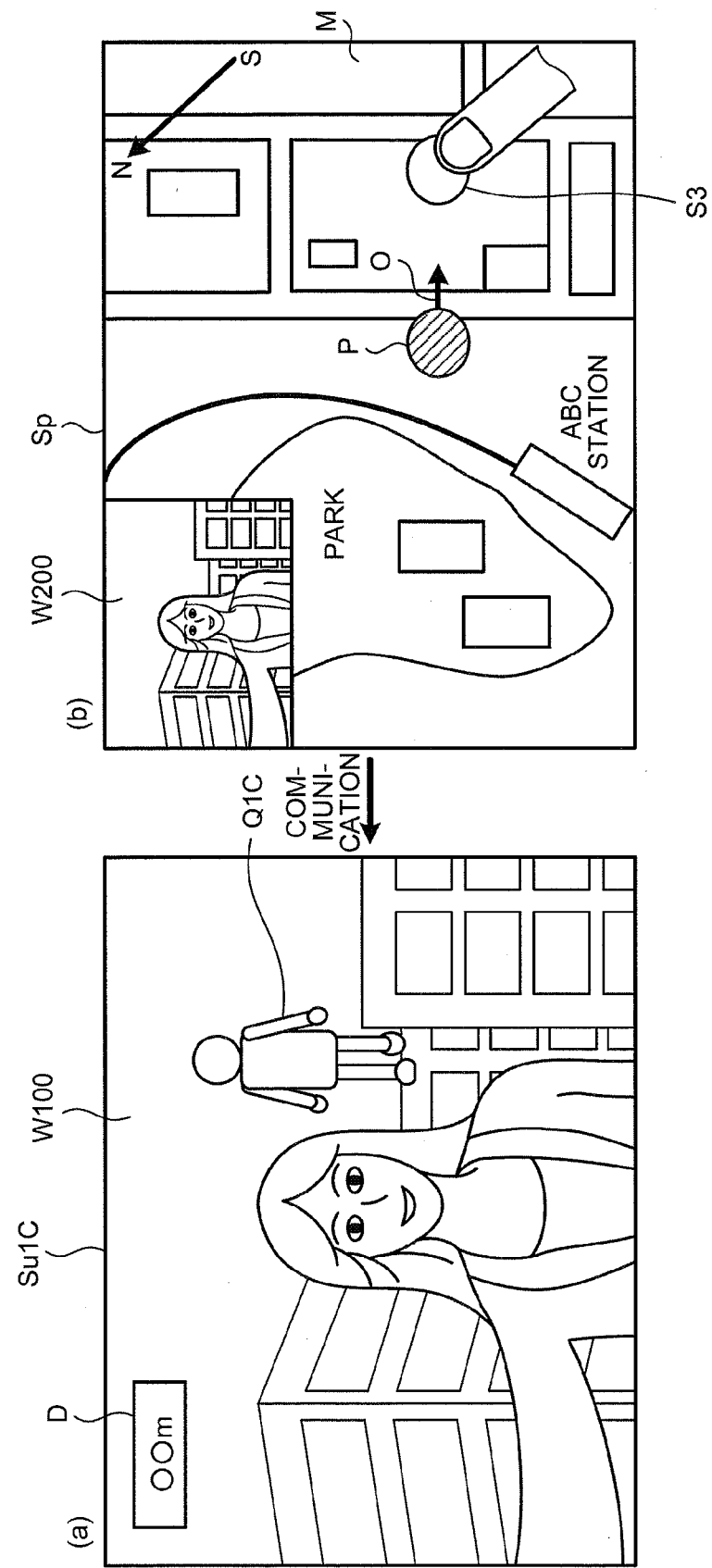
FIG. 10 is a diagram illustrating an example of the first advice operation performed by the user of the communication device and of the first superimposed image displayed by the imaging apparatus, upon the operation of the imaging system illustrated in FIG. 4 and FIG. 5.

FIG. 10 is a diagram illustrating an example of the first advice operation (instructing the specified shooting spot S3) performed by the user of the communication device 3 and of the first superimposed image displayed by the imaging apparatus 2, when the imaging system 1 is operated.

If the specified shooting spot S3, which is positioned on a back side when viewed from the user CU of the imaging apparatus 2, is instructed, the communication device 3 generates shooting instruction information including information related to a longitude and a latitude of the specified shooting spot S3 corresponding to the touched position in the map image "M" (step S208) and transmits the shooting instruction information to the imaging apparatus 2 (step S209).

When the imaging apparatus 2 receives the shooting instruction information (Step S108: Yes), at step S109, the imaging apparatus 2 recognizes, by a process similar to that in the case in which the specified shooting post S1 is instructed, that a position of the specified shooting spot S3 (target position) is on the back side of the user CU of the imaging apparatus 2. The imaging apparatus 2 generates a first pseudo image Q1C ((a) of FIG. 10) that simulatively expresses an action of a person walking to a back side (a walking person gradually becoming smaller). Further, the imaging apparatus 2 generates, by a process similar to that in the case in which the specified shooting spot S1 is instructed, distance information (the distance image "D" ((a) of FIG. 10)) related to a distance from the current position of the imaging apparatus 2 to the target position. The imaging apparatus 2 then displays a first superimposed image Su1C ((a) of FIG. 10), which is the live view image W100 that has been superimposed with the first pseudo image Q1C and the distance image "D" (step S110).

When Specified Shooting Spot S4 is Instructed

Figure 11:
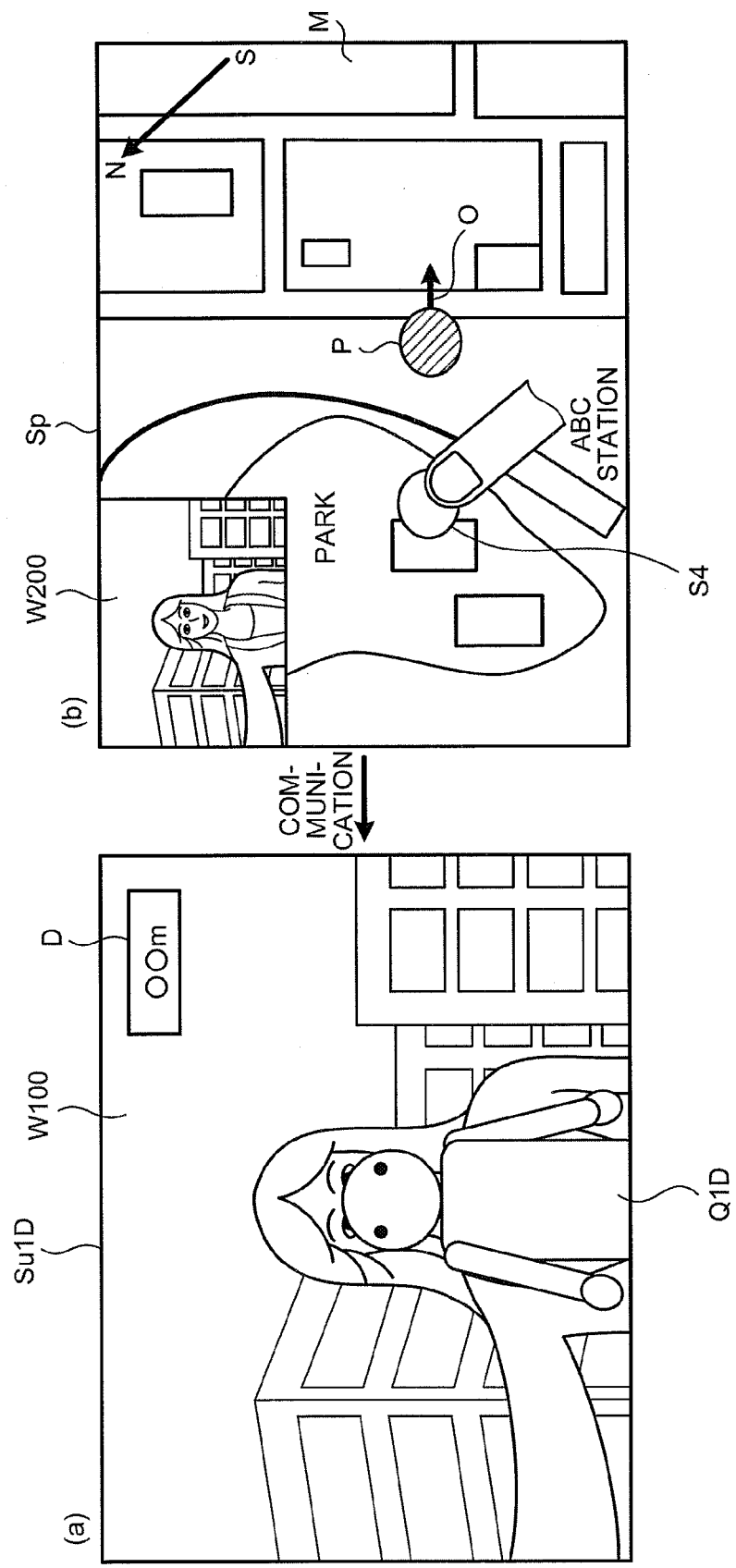
FIG. 11 is a diagram illustrating an example of the first advice operation performed by the user of the communication device and of the first superimposed image displayed by the imaging apparatus, upon the operation of the imaging system illustrated in FIG. 4 and FIG. 5.

FIG. 11 is a diagram illustrating an example of the first advice operation (instructing the specified shooting spot S4)

performed by the user of the communication device 3 and of the first superimposed image displayed by the imaging apparatus 2, when the imaging system 1 is operated.

If the specified shooting spot S4, which is positioned on a front side when viewed from the user CU of the imaging apparatus 2, is instructed, the communication device 3 generates shooting instruction information including information related to a longitude and a latitude of the specified shooting spot S4 corresponding to the touched position in the map image "M" (step S208) and transmits the shooting instruction information to the imaging apparatus 2 (step S209).

When the imaging apparatus 2 receives the shooting instruction information (step S108: Yes), at step S109, the imaging apparatus 2 recognizes, by a process similar to that in the case in which the specified shooting spot S1 is instructed, that a position of the specified shooting spot S4 (target position) is on the front side of the user CU of the imaging apparatus 2. The imaging apparatus 2 generates a first pseudo image Q1D ((a) of FIG. 11) that simulatively expresses an action of a person walking to a front side (a walking person gradually becoming larger). Further, the imaging apparatus 2 generates, by a process similar to that in the case in which the specified shooting spot S1 is instructed, distance information (the distance image "D" ((a) of FIG. 11)) related to a distance from the current position of the imaging apparatus 2 to the target position. The imaging apparatus 2 then displays a first superimposed image Su1D ((a) of FIG. 11), which is the live view image W100 that has been superimposed with the first pseudo image Q1D and the distance image "D" (step S110).

When Specified Shooting Spot S5 is Instructed

Figure 12:
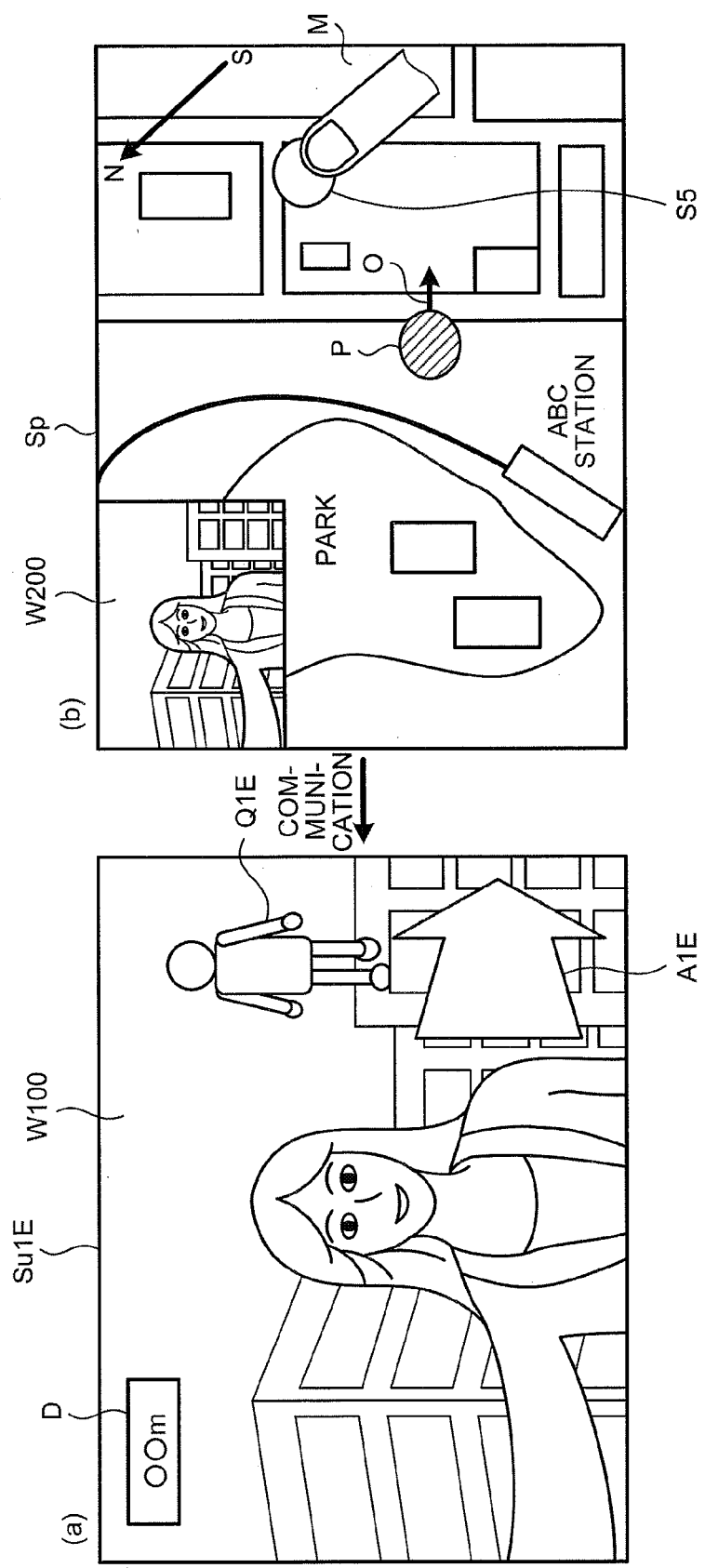
FIG. 12 is a diagram illustrating an example of the first advice operation performed by the user of the communication device and of the first superimposed image displayed by the imaging apparatus, upon the operation of the imaging system illustrated in FIG. 4 and FIG. 5.
Figure 13:
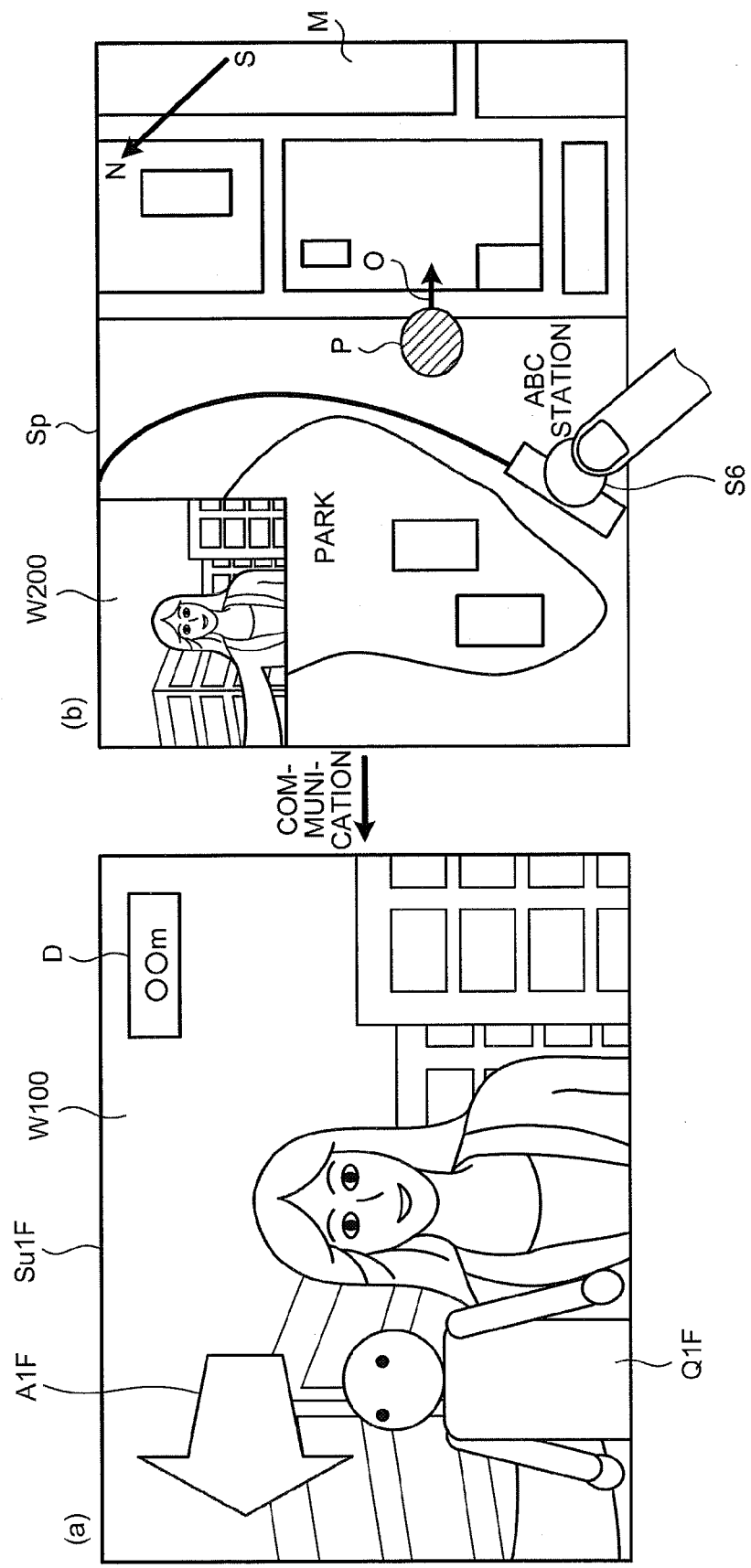
FIG. 13 is a diagram illustrating an example of the first advice operation performed by the user of the communication device and of the first superimposed image displayed by the imaging apparatus, upon the operation of the imaging system illustrated in FIG. 4 and FIG. 5.

FIG. 12 is a diagram illustrating an example of the first advice operation (instructing the specified shooting spot S5) performed by the user of the communication device 3 and of the first superimposed image displayed by the imaging apparatus 2, when the imaging system 1 is operated.

If the specified shooting spot S5, which is positioned on a diagonally right back side when viewed from the user CU of the imaging apparatus 2, is instructed, the communication device 3 generates shooting instruction information including information related to a longitude and a latitude of the specified shooting spot S5 corresponding to the touched position in the map image "M" (step S208) and transmits the shooting instruction information to the imaging apparatus 2 (step S209).

When the imaging apparatus 2 receives the shooting instruction information (step S108: Yes), at step S109, the imaging apparatus 2 recognizes, by a process similar to that in the case in which the specified shooting spot S1 is instructed, that a position of the specified shooting spot S5 (target position) is on the diagonally right back side of the user CU of the imaging apparatus 2. The imaging apparatus 2 generates a first pseudo image Q1E ((a) of FIG. 12) that simulatively expresses an action of a person walking to a diagonally right back side (a walking person gradually becoming smaller while moving to a right side). Further, the imaging apparatus 2 generates, by a process similar to that in the case in which the specified shooting spot S1 is instructed, distance information (the distance image "D" ((a) of FIG. 12)) related to a distance from the current position of the imaging apparatus 2 to the target position. The imaging apparatus 2 then displays a first superimposed image Su1E ((a) of FIG. 12), which is the live view image W100 that has been superimposed with the first pseudo image Q1E, the distance image "D", and an arrow image A1E ((a) of FIG. 12) that is directed to a right side and becomes narrower towards the right side (step S110).

When Specified Shooting Spot S6 is Instructed

FIG. 13 is a diagram illustrating an example of the first advice operation (instructing the specified shooting spot S6) performed by the user of the communication device 3 and of the first superimposed image displayed by the imaging apparatus 2, when the imaging system 1 is operated.

If the specified shooting spot S6, which is positioned on a diagonally left front side when viewed from the user CU of the imaging apparatus 2, is instructed, the communication device 3 generates shooting instruction information including information related to a longitude and a latitude of the specified shooting spot S6 corresponding to the touched position in the map image "M" (step S208) and transmits the shooting instruction information to the imaging apparatus 2 (step S209).

When the imaging apparatus 2 receives the shooting instruction information (step S108: Yes), at step S109, the imaging apparatus 2 recognizes, by a process similar to that in the case in which the specified shooting spot S1 is instructed, that a position of the specified shooting spot S6 (target position) is on the diagonally left front side of the user CU of the imaging apparatus 2. The imaging apparatus 2 generates a first pseudo image Q1F ((a) of FIG. 13) that simulatively expresses an action of a person walking to a diagonally left front side (a walking person gradually becoming larger while moving to a left side). Further, the imaging apparatus 2 generates, by a process similar to that in the case in which the specified shooting spot S1 is instructed, distance information (the distance image "D" ((a) of FIG. 13)) related to a distance from the current position of the imaging apparatus 2 to the target position. The imaging apparatus 2 then displays a first superimposed image Su1F ((a) of FIG. 13), which is the live view image W100 that has been superimposed with the first pseudo image Q1F, the distance image "D", and an arrow image A1F ((a) of FIG. 13) that is directed to a left side and becomes thicker towards the left side (step S110).

The above described imaging apparatus 2 according to this first embodiment generates a pseudo image that simulatively expresses an action of a user of the imaging apparatus 2 according to an action instruction based on action instruction information when the imaging apparatus 2 receives the action instruction information from the external communication device 3. The imaging apparatus 2 then displays the pseudo image.

Therefore, by this pseudo image displayed by the imaging apparatus 2, the user of the imaging apparatus 2 is able to recognize the action instruction instructed by a user of the communication device 3 and to perform an operation corresponding to the action instruction. That is, without using other communication means, such as a mobile phone, the user of the communication device 3 is able to variously give advice to the user of the imaging apparatus 2.

In particular, the imaging apparatus 2 generates and displays, according to the action instruction (advice), the above described pseudo image, rather than a figure of characters, an arrow, or the like. Therefore, even if the user of the imaging apparatus 2 does not know terms particular to the imaging apparatus 2 or even if the user of the imaging apparatus 2 is not used to handling of the imaging apparatus 2, by the pseudo image, the user of the imaging apparatus 2 is able to clearly recognize the action instruction from the user of the communication device 3.

Thus, the imaging apparatus 2 according to this first embodiment is able improve user-friendliness thereof.

Further, the imaging apparatus 2 according to the first embodiment includes the position acquiring unit 21 and the first orientation acquiring unit 22, which respectively acquire the position information and the first orientation information of the imaging apparatus 2.

Therefore, if the action instruction information is the shooting instruction information related to advice on a shooting spot (including information related to a longitude and a latitude of the shooting spot), the imaging apparatus 2 is able to generate and display the first pseudo image for guiding the user of the imaging apparatus 2 from the current position to the shooting spot instructed by the user of the communication device 3. Further, the imaging apparatus 2 is able to generate and display a distance image related to a distance from the current position of the imaging apparatus to the shooting spot instructed by the user of the communication device 3.

Therefore, the user of the imaging apparatus 2 is able to immediately determine whether or not to follow the instruction from the communication device 3 by grasping the first pseudo image and distance image (for example, if the user determines that the distance to the shooting spot is far, the user does not follow the instruction), and if the user does not follow the instruction, in order to receive advice on another shooting spot, she is able to perform an advice request operation again.

Further, the imaging apparatus 2 according to the first embodiment transmits, according to the advice request operation on the first input unit 23 by the user of the imaging apparatus 2, the position information, which was acquired by the position acquiring unit 21 when the operation was made, to the communication device 3.

Therefore, the communication device 3 is able to display, as a specification screen for giving advice on a shooting spot to the user of the imaging apparatus 2, a map of a predetermined reduced scale including a longitude and a latitude based on the position information of the imaging apparatus 2.

Accordingly, the user of the communication device 3 is able to give advice on a shooting spot comparatively near the current position of the imaging apparatus, from the specification screen.

Further, in this first embodiment, the subject is the user of the imaging apparatus 2. If the first display unit 291 is positioned at the self shooting position, the imaging apparatus 2 causes the image, which is to be displayed, to be inverted with respect to the main body unit 2A and displays it on the first display unit 291.

As a result, based on the first pseudo image, even if the user of the imaging apparatus is performing self shooting, the user is able to clearly recognize a direction of the shooting spot.

Further, the imaging apparatus 2 according to the first embodiment transmits the live view image data to the communication device 3. The communication device 3 displays the live view image corresponding to the received live view image data.

Therefore, the user of the communication device 3 is able to grasp the way the subject is dressed, or the like, and give advice on a shooting spot fitted for the subject.

Second Embodiment

Next, a second embodiment of the present invention will be described.

In the description below, configurations and steps similar to those of the above described first embodiment will be appended with the same signs and detailed description thereof will be omitted or simplified.

In the above described first embodiment, the imaging apparatus 2 generates a pseudo image (first pseudo image) and displays a first superimposed image, which is a live view image that has been superimposed with the first pseudo image, only when the imaging apparatus 2 receives advice on a shooting spot from a user of the communication device 3 (when shooting instruction information is received).

In contrast, in the second embodiment, in addition to generating a first pseudo image and displaying a first superimposed image in the above case, an imaging apparatus generates a pseudo image (second pseudo image) and displays a second superimposed image, which is a live view image that has been superimposed with the second pseudo image, when advice on a camera angle of the imaging apparatus with respect to the subject is received (when angle change instruction information is received).

The imaging system according to the second embodiment has a configuration similar to that of the imaging system 1 described in the first embodiment.

Hereinafter, operations of the imaging system 1 according to the second embodiment (operations of the imaging apparatus 2 (an imaging method according to the present invention) and operations of the communication device 3) will be described.

Operations of Imaging Apparatus

Figure 14:
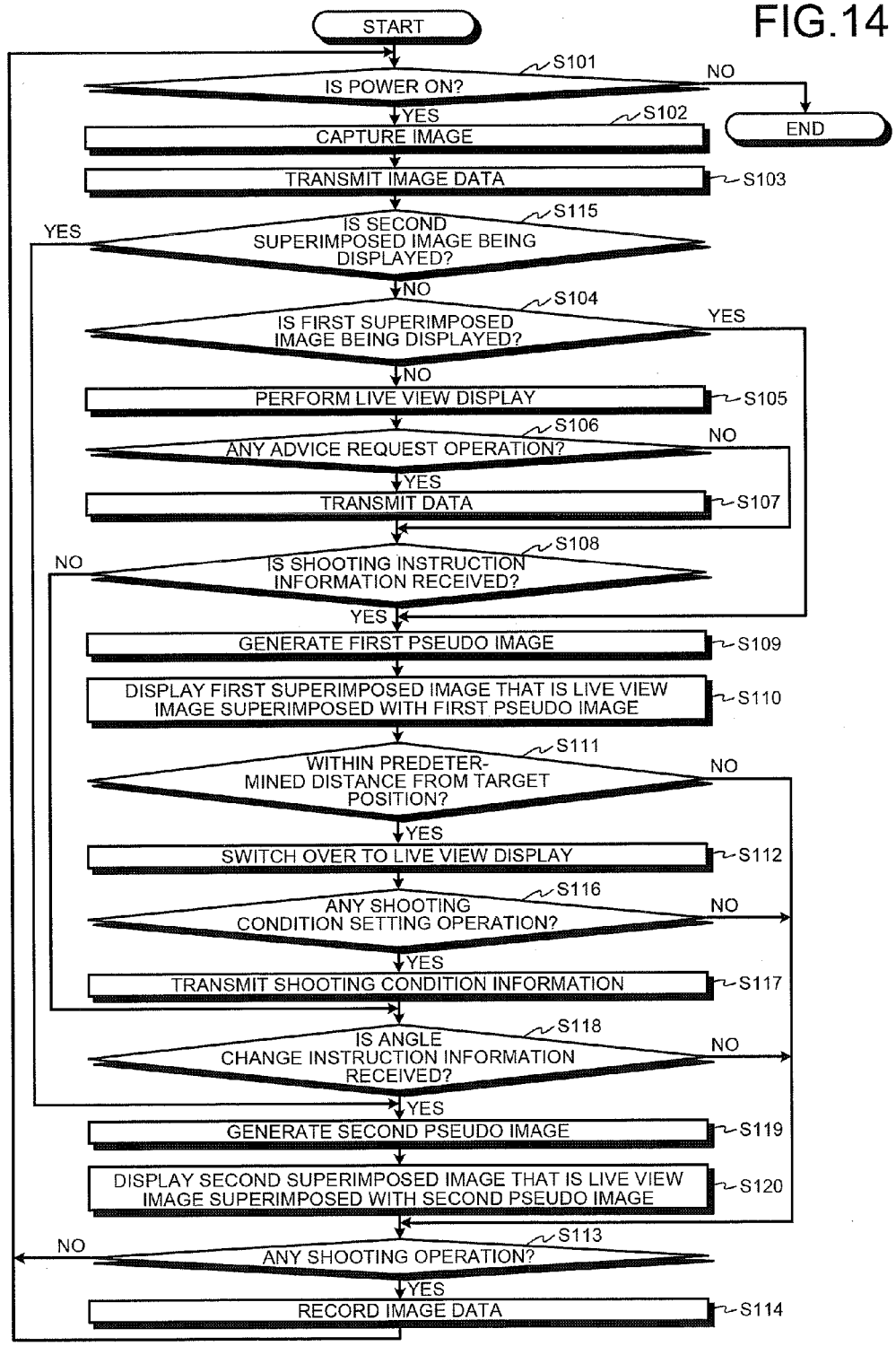
FIG. 14 is a flow chart illustrating operations of an imaging apparatus according to a second embodiment of the present invention.

FIG. 14 is a flow chart illustrating the operations of the imaging apparatus 2 according to the second embodiment of the present invention.

As illustrated in FIG. 14, the operations of the imaging apparatus 2 according to the second embodiment are different from the operations of the imaging apparatus 2 described in the first embodiment (FIG. 4) only in that steps S115 to S120 have been added thereto.

Therefore, hereinafter, only steps S115 to S120 will be described.

Step S115 is executed after step S103.

Specifically, the first control unit 28 determines whether or not display of a second superimposed image at later described step S120 has started and the second superimposed image is being displayed (step S115).

If it is determined that the second superimposed image is being displayed (step S115: Yes), the imaging apparatus 2 proceeds to step S119.

On the contrary, if it is determined that the second superimposed image is not being displayed (step S115: No), the imaging apparatus 2 proceeds to step S104.

Step S116 is executed after step S112.

Specifically, the first communication control unit 281 determines whether or not there has been a shooting condition setting operation onto the first input unit 23 by a user of the imaging apparatus 2 (step S116).

The shooting condition setting operation is an operation for receiving advice on a camera angle of the imaging apparatus 2 with respect to a subject, and for example, for a case in which shooting like a model is desired, inputting a shooting condition (such as "model-like") therefor can be exemplified as the shooting condition setting operation.

This shooting condition setting operation corresponds to a first operation according to the present invention. The first input unit 23 has a function as a first operation receiving unit according to the present invention.

If it is determined that there has not been any shooting condition setting operation (step S116: No), the imaging apparatus 2 proceeds to step S113.

On the contrary, if it is determined that there has been a shooting condition setting operation (step S116: Yes), the first communication control unit 281 transmits, via the first communication unit 24, shooting condition information related to a shooting condition input by the shooting condition setting operation, to the communication device 3 (step S117).

After step S117, or if it is determined that shooting instruction information has not been received (step S108: No), the first communication control unit 281 determines whether or not angle change instruction information has been received from the communication device 3 via the first communication unit 24 (step S118).

If it is determined that the angle change instruction information has not been received (step S118: No), the imaging apparatus 2 proceeds to step S113.

On the contrary, if it is determined that the angle change instruction information has been received (step S118: Yes), the first control unit 28 stores the angle change instruction information into the first memory unit 25. The pseudo image generating unit 283 generates, based on the angle change instruction information stored in the first memory unit 25, a second pseudo image for causing the user of the imaging apparatus 2 to change a camera angle of the imaging apparatus 2 (step S119: pseudo image generating step). If it is determined that the second superimposed image is being displayed (step S115: Yes), the pseudo image generating unit 283 also generates the second pseudo image at step S119.

After step S119, the first display control unit 282 causes the first display unit 291 to display the second superimposed image, which is the live view image corresponding to the latest live view image data stored in the first memory unit 25, the live view image having been superimposed with the second pseudo image generated in step S119 (step S120: displaying step). Thereafter, the imaging apparatus 2 proceeds to step S113.

Operations of Communication Device

Figure 15:
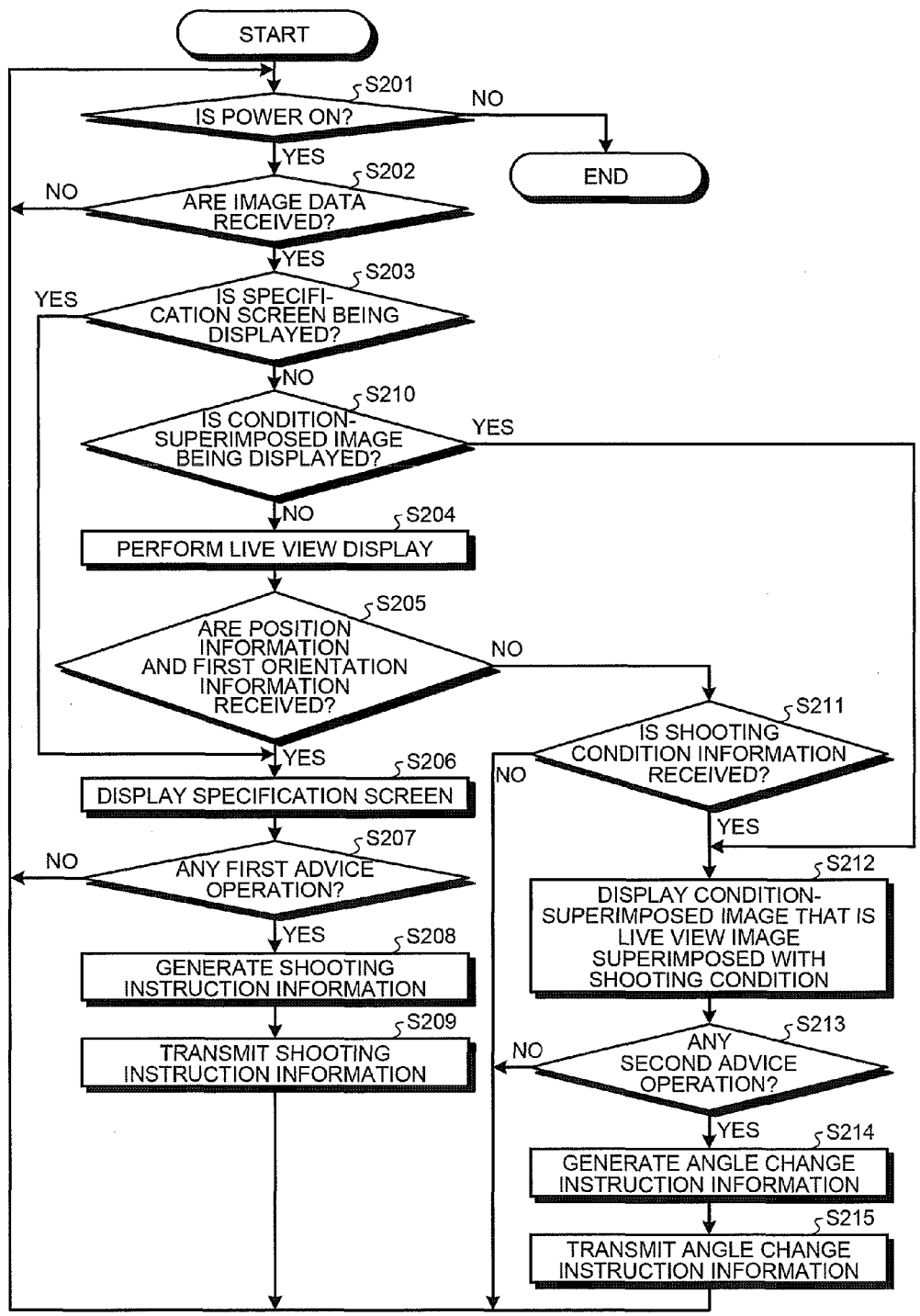
FIG. 15 is a flow chart illustrating operations of a communication device according to the second embodiment of the present invention.

FIG. 15 is a flow chart illustrating operations of the communication device 3 according to the second embodiment of the present invention.

As illustrated in FIG. 15, the operations of the communication device 3 according to the second embodiment are different from the operations of communication device 3 described in the first embodiment (FIG. 5) only in that steps S210 to S215 have been added thereto.

Therefore, hereinafter, only steps S210 to S215 will be described.

Step S210 is executed after it is determined that the specification screen is not being displayed (step S203: No).

Specifically, the first control unit 28 determines whether or not display of a condition-superimposed image has started in later described step S212 and the condition-superimposed image is being displayed (step S210).

If it is determined that the condition-superimposed image is being displayed (step S210: Yes), the imaging apparatus 2 proceeds to step S212.

it is determined that the condition-superimposed image is not being displayed (step S210: No), the imaging apparatus 2 proceeds to step S204.

Step S211 is executed after it is determined that the position information and first orientation information of the imaging apparatus 2 have not been received (step S205: No).

Specifically, the second communication control unit 361 determines whether or not shooting condition information has been received from the imaging apparatus 2 via the second communication unit 33 (step S211).

If it is determined that the shooting condition information has not been received (step S211: No), the communication device 3 returns to step S201.

On the contrary, if it is determined that the shooting condition information has been received (step S211: Yes), the second display control unit 362 causes the second display unit 31 to display a condition-superimposed image, which is the live view image corresponding to the latest live view image data stored in the second memory unit 34, the live view image having been superimposed with the shooting condition based on the shooting condition information (step S212).

Subsequently, the action instruction information generating unit 363 determines whether or not there has been an operation (hereinafter, referred to as "second advice operation") related to an angle change instruction (advice on a camera angle of the imaging apparatus 2 with respect to the subject) onto the second input unit 32 by the user of the communication device 3 (step S213).

This second advice operation corresponds to a second operation according to the present invention.

If it is determined that there has not been any second advice operation (step S213: No), the communication device 3 returns to step S201.

On the contrary, if it is determined that there has been the second advice operation (step S213: Yes), the action instruction information generating unit 363 generates angle change instruction information related to the angle change instruction (step S214).

Subsequently, the second communication control unit 361 transmits, via the second communication unit 33, the angle change instruction information generated in step S214 to the imaging apparatus 2 (step S215). Thereafter, the communication device 3 returns to step S201.

Specific Examples of Display Modes

Specific examples of the second advice operation performed by the user of the communication device 3 and the second superimposed image displayed by the imaging apparatus 2, when the above described imaging system 1 according to the second embodiment is operated, will be described.

Hereinafter, an example will be described, which is a case in which the user CU of the imaging apparatus 2 performs self shooting of shooting the user CU herself as a subject, similarly to the above described first embodiment (FIG. 6).

At step S212, the communication device 3 displays a condition-superimposed image Sc, which is a live view image W201 corresponding to the latest live view image data, the live view image W201 having been superimposed with a shooting condition "C", such as "model-like", based on the shooting condition information received from the imaging apparatus 2 (see FIG. 16 to FIG. 22). By checking the condition-superimposed image Sc displayed by the communication device 3, a user of the communication device 3 grasps the shooting condition "C" desired by the user CU of the imaging apparatus 2.

If the user of the communication device 3 wants to give advice corresponding to the shooting condition "C" to the user CU of the imaging apparatus 2 (advice on a positional relation between the imaging apparatus 2 and the user CU of the imaging apparatus 2), the user of the communication device 3 says a word corresponding to the advice.

Hereinafter, a case in which the user of the communication device 3 says words W1 to W7 (see (b) of FIG. 16 to (b) of FIG. 22) as the second advice operation will be described in order.

If Word W1 is Said

Figure 16:
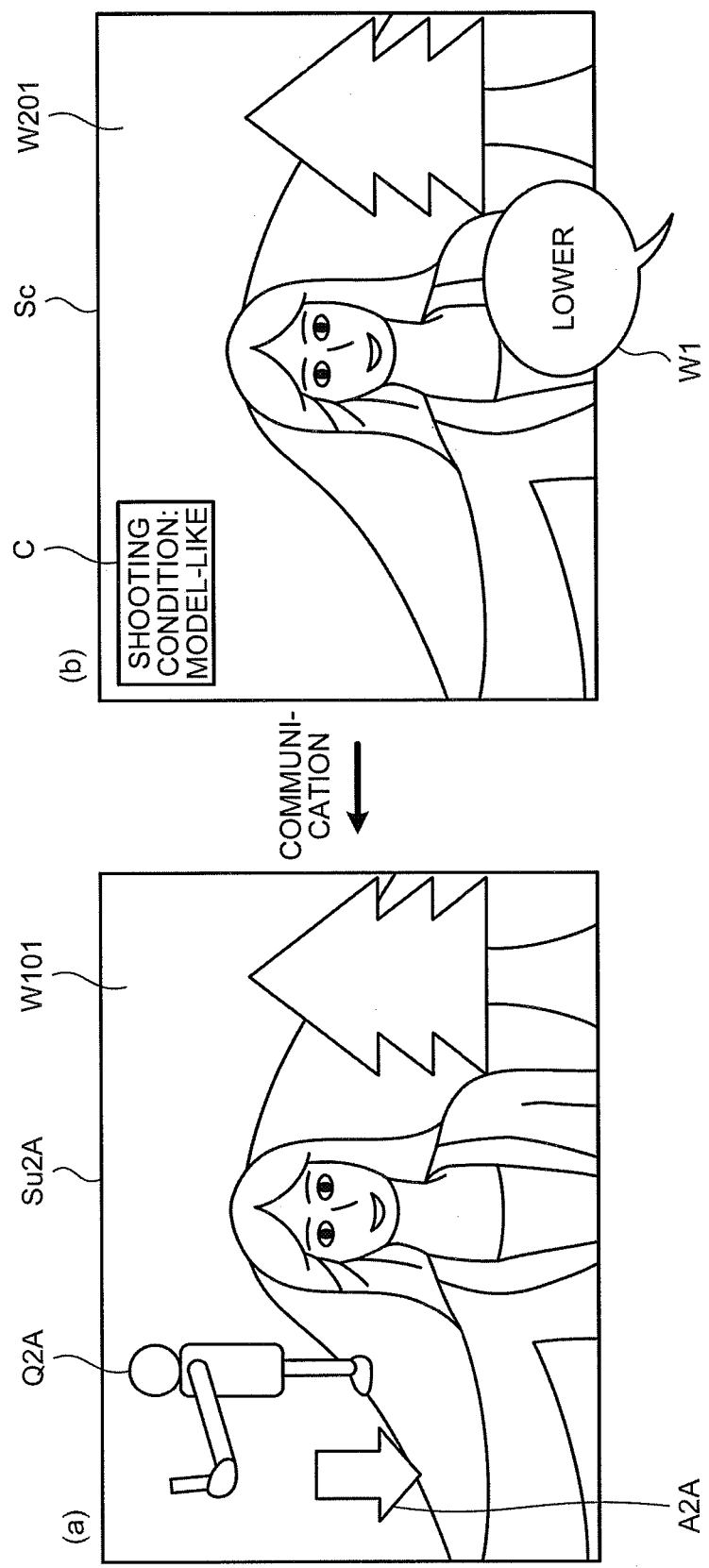
FIG. 16 is a diagram illustrating an example of a second advice operation performed by a user of the communication device and of a second superimposed image displayed by the imaging apparatus, upon operation of an imaging system illustrated in FIG. 14 and FIG. 15.

FIG. 16 is a diagram illustrating an example of the second advice operation (word W1) performed by the user of the communication device 3 and of the second superimposed image displayed by the imaging apparatus 2, when the imaging system 1 is operated.

If the user of the communication device 3 says the word W1, such as "lower", the communication device 3 determines, based on voice data (voice data corresponding to the word W1) from the second input unit (such as a microphone) 32, that there has been a second advice operation (step S213: Yes). Further, the communication device 3 analyzes the voice data, generates (step S214) and transmits to the imaging apparatus 2 (step S215), angle change instruction information related to advice (angle change instruction) to shoot at a low angle.

When the imaging apparatus 2 receives the angle change instruction information (step S118: Yes), the imaging apparatus 2 generates, based on the angle change instruction information, a second pseudo image Q2A ((a) of FIG. 16) that simulatively expresses an action of a person lowering a camera held by the person (simulatively expresses a state in which the user of the imaging apparatus 2 is setting the imaging apparatus 2 to a camera angle corresponding to the angle change instruction based on the angle change instruction information), in order to cause the user CU of the imaging apparatus 2 to perform shooting at a low angle (step S119). The imaging apparatus 2 displays a second superimposed image Su2A ((a) of FIG. 16), which is a live view image W101 corresponding to the latest live view image data, the live view image W101 having been superimposed with the second pseudo image Q2A and an arrow image A2A in a down direction ((a) of FIG. 16) (step S120).

If Word W2 is Said

Figure 17:
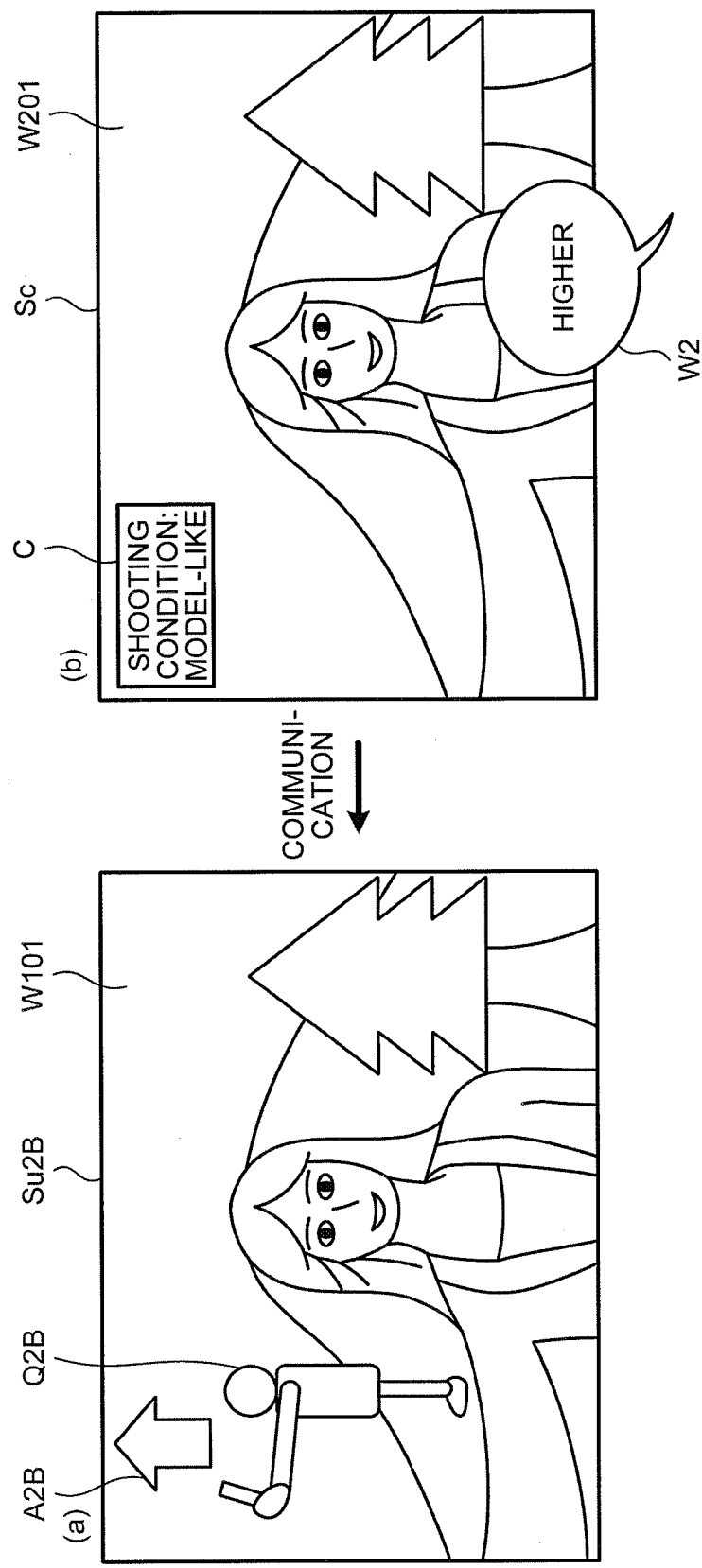
FIG. 17 is a diagram illustrating an example of the second advice operation performed by the user of the communication device and of the second superimposed image displayed by the imaging apparatus, upon the operation of the imaging system illustrated in FIG. 14 and FIG. 15.

FIG. 17 is a diagram illustrating an example of the second advice operation (word W2) performed by the user of the communication device 3 and of the second superimposed image displayed by the imaging apparatus 2, when the imaging system 1 is operated.

If the user of the communication device 3 says the word W2, such as "higher", the communication device 3 analyzes voice data corresponding to the word W2 from the second input unit 32 and generates (step S214) and transmits to the imaging apparatus 2 (step S215), angle change instruction information related to advice to shoot at a high angle (step S215).

When the imaging apparatus 2 receives the angle change instruction information (step S118: Yes), the imaging apparatus 2 generates, based on the angle change instruction information, a second pseudo image Q2B ((a) of FIG. 17) that simulatively expresses an action of a person raising a camera held by the person, in order to cause the user CU of the imaging apparatus 2 to perform shooting at a high angle (step S119). The imaging apparatus 2 displays a second superimposed image Su2B ((a) of FIG. 17), which is a live view image W101 that has been superimposed with the second pseudo image Q2B and an arrow image A2B ((a) of FIG. 17) in an up direction (step S120).

When Word W3 is Said

Figure 18:
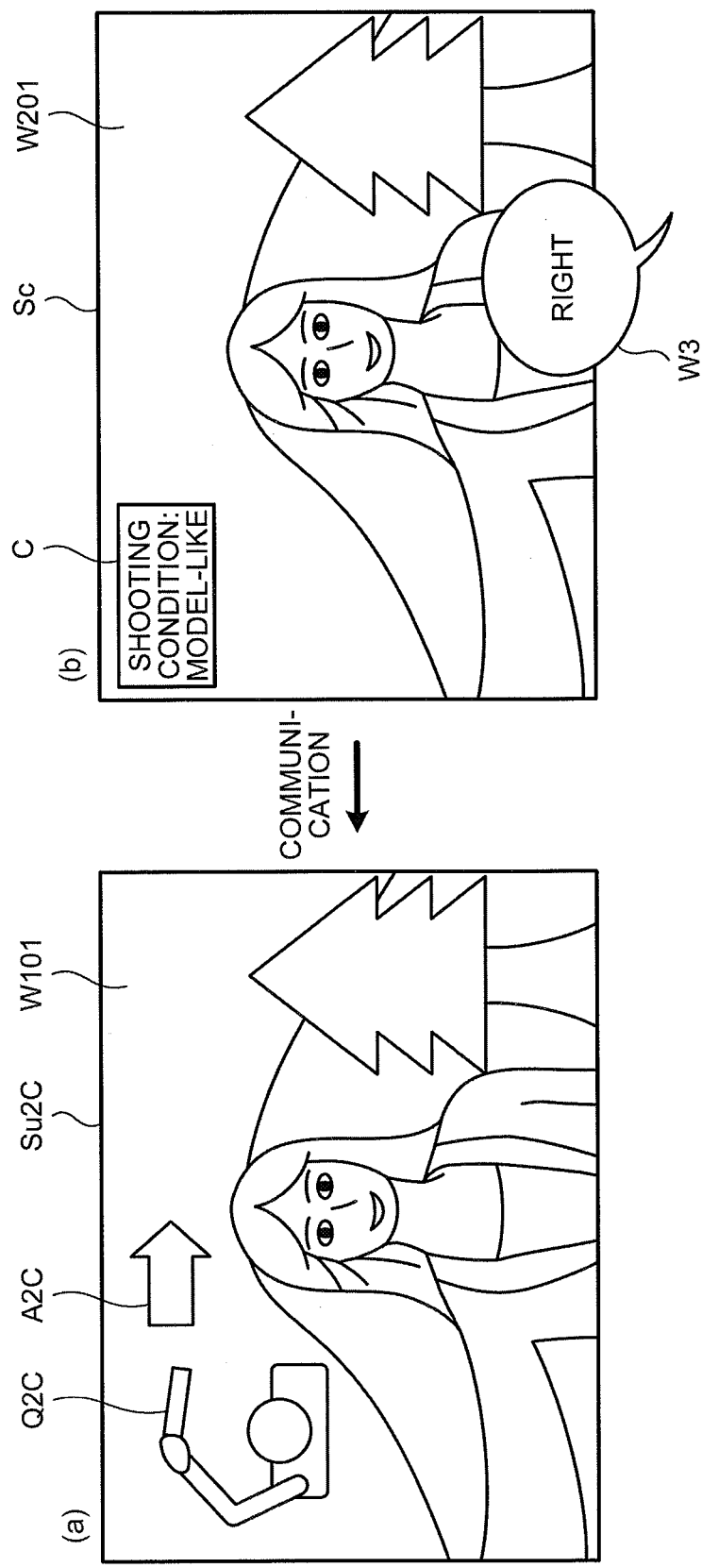
FIG. 18 is a diagram illustrating an example of the second advice operation performed by the user of the communication device and of the second superimposed image displayed by the imaging apparatus, upon the operation of the imaging system illustrated in FIG. 14 and FIG. 15.

FIG. 18 is a diagram illustrating an example of the second advice operation (word W3) performed by the user of the communication device 3 and of the second superimposed image displayed by the imaging apparatus 2, when the imaging system 1 is operated.

If the user of the communication device 3 says the word W3, such as "Right", the communication device 3 analyzes voice data corresponding to the word W3 from the second input unit 32 and generates (step S214) and transmits to the imaging apparatus 2 (step S215), angle change instruction information related to advice to shoot from a right side (step S215).

When the imaging apparatus 2 receives the angle change instruction information (step S118: Yes), the imaging apparatus 2 generates, based on the angle change instruction information, a second pseudo image Q2C ((a) of FIG. 18) that simulatively expresses an action of a person moving a camera held by the person to a right side, in order to cause the user CU of the imaging apparatus 2 to perform shooting from a right side (step S119). The imaging apparatus 2 displays a second superimposed image Su2C ((a) of FIG. 18), which is the live view image W101 that has been superimposed with the second pseudo image Q2C and an arrow image A2C ((a) of FIG. 18) in a right direction (step S120).

If Word W4 is Said

Figure 19:
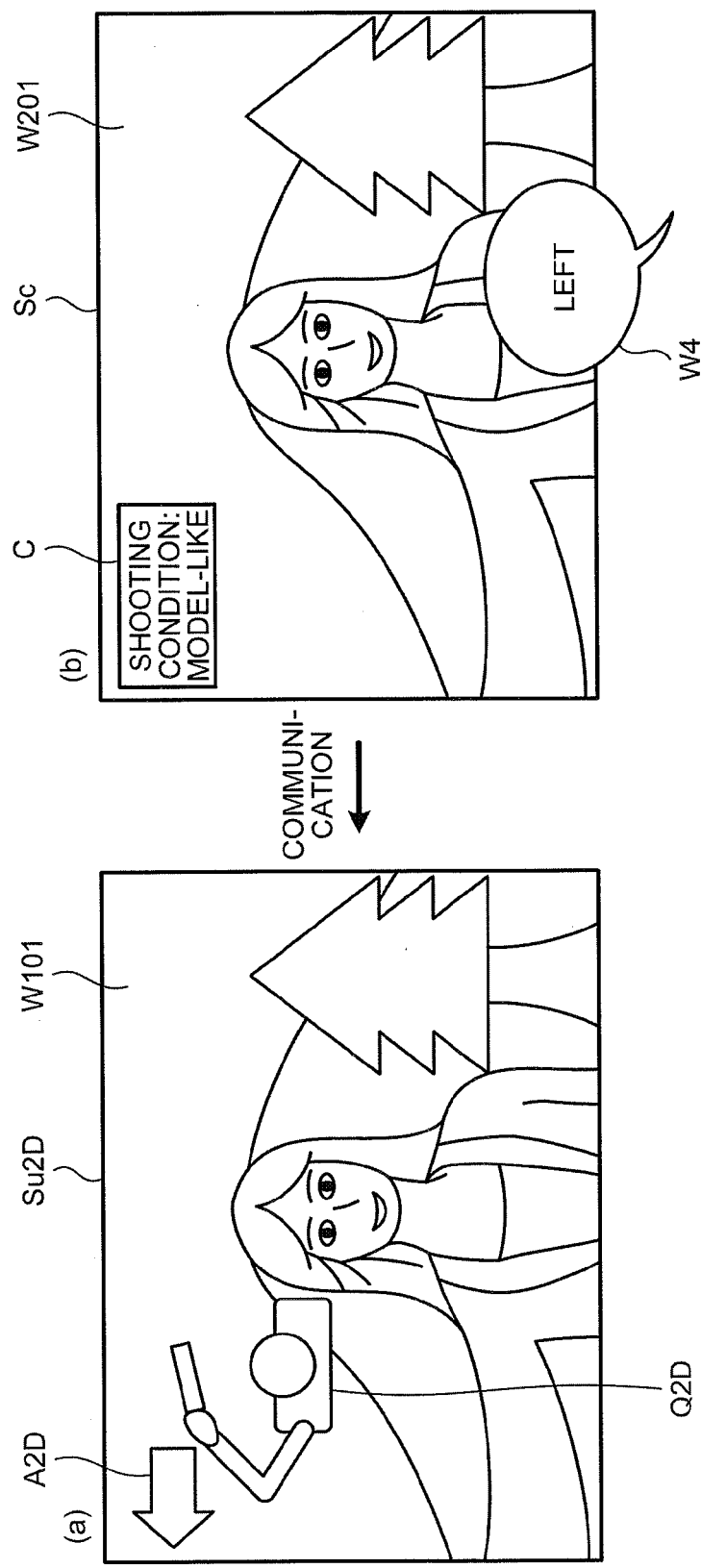
FIG. 19 is a diagram illustrating an example of the second advice operation performed by the user of the communication device and of the second superimposed image displayed by the imaging apparatus, upon the operation of the imaging system illustrated in FIG. 14 and FIG. 15.

FIG. 19 is a diagram illustrating an example of the second advice operation (word W4) performed by the user of the communication device 3 and of the second superimposed image displayed by the imaging apparatus 2, when the imaging system 1 is operated.

If the user of the communication device 3 says the word W4, such as "Left", the communication device 3 analyzes voice data corresponding to the word W4 from the second input unit 32 and generates (step S214) and transmits to the imaging apparatus 2 (step S215), angle change instruction information related to advice to shoot from a left side (step S215).

When the imaging apparatus 2 receives the angle change instruction information (step S118: Yes), the imaging apparatus 2 generates, based on the angle change instruction information, a second pseudo image Q2D ((a) of FIG. 19) that simulatively expresses an action of a person moving a camera held by the person to the left side, in order to cause the user CU of the imaging apparatus 2 to perform shooting from a left side (step S119). The imaging apparatus 2 displays a second superimposed image Su2D ((a) of FIG. 19), which is the live view image W101 that has been superimposed with the second pseudo image Q2D and an arrow image A2D ((a) of FIG. 19) in a left direction (step S120).

If Word W5 is Said

Figure 20:
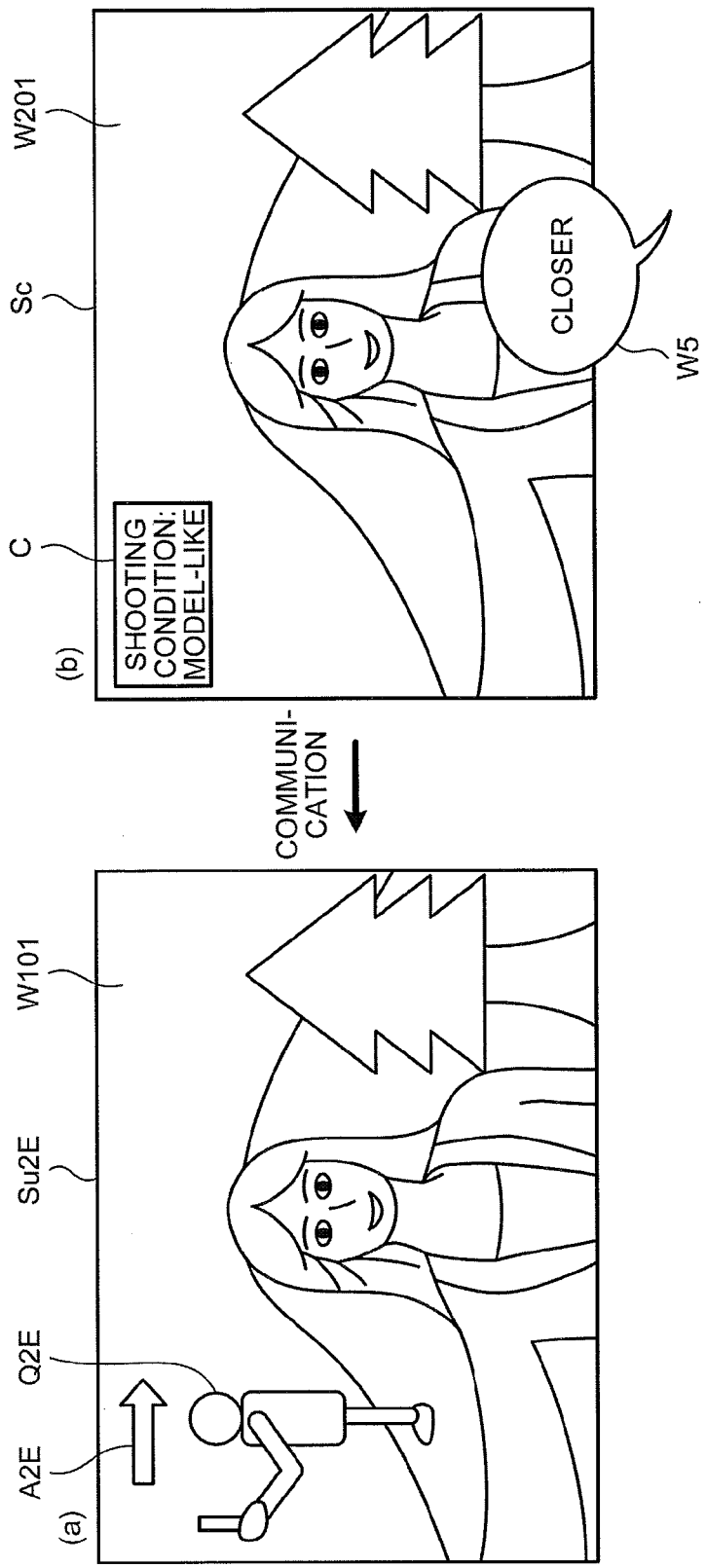
FIG. 20 is a diagram illustrating an example of the second advice operation performed by the user of the communication device and of the second superimposed image displayed by the imaging apparatus, upon the operation of the imaging system illustrated in FIG. 14 and FIG. 15.

FIG. 20 is a diagram illustrating an example of the second advice operation (word W5) performed by the user of the communication device 3 and of the second superimposed image displayed by the imaging apparatus 2, when the imaging system 1 is operated.

If the user of the communication device 3 says the word W5, such as "Closer", the communication device 3 analyzes voice data corresponding to the word W5 from the second input unit 32 and generates (step S214) and transmits to the imaging apparatus 2 (step S215), angle change instruction information related to advice to shoot from a close position (step S215).

When the imaging apparatus 2 receives the angle change instruction information (step S118: Yes), the imaging apparatus 2 generates, based on the angle change instruction information, a second pseudo image Q2E ((a) of FIG. 20) that simulatively expresses an action of a person bringing a camera held by the person closer to the person, in order to cause the user CU of the imaging apparatus 2 to perform shooting from a close position (step S119). The imaging apparatus 2 displays a second superimposed image Su2E ((a) of FIG. 20), which is the live view image W101 that has been superimposed with the second pseudo image Q2E and an arrow image A2D ((a) of FIG. 20) directed to the person from the camera (step S120).

If Word W6 is Said

Figure 21:
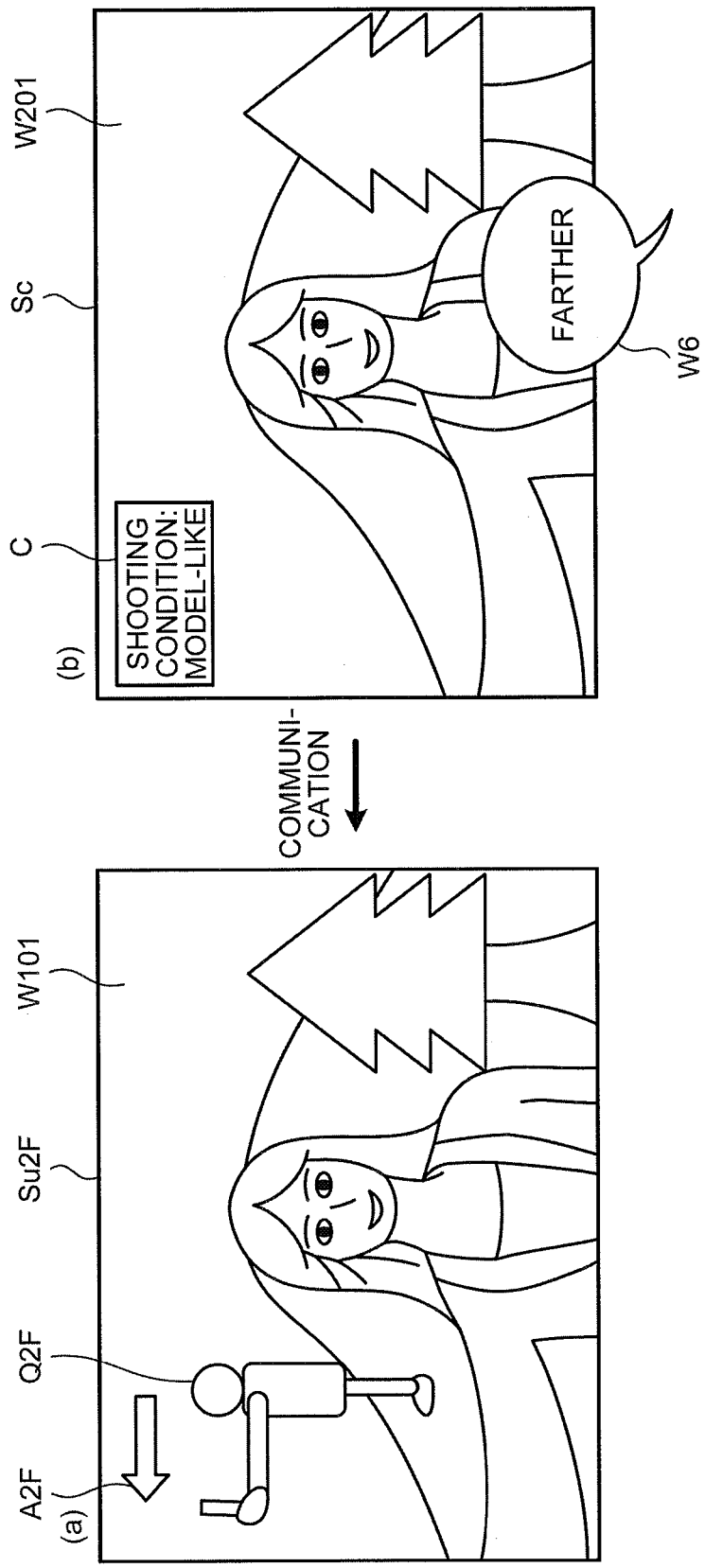
FIG. 21 is a diagram illustrating an example of the second advice operation performed by the user of the communication device and of the second superimposed image displayed by the imaging apparatus, upon the operation of the imaging system illustrated in FIG. 14 and FIG. 15.

FIG. 21 is a diagram illustrating an example of the second advice operation (word W6) performed by the user of the communication device 3 and of the second superimposed image displayed by the imaging apparatus 2, when the imaging system 1 is operated.

If the user of the communication device 3 says the word W6, such as "Farther", the communication device 3 analyzes voice data corresponding to the word W6 from the second input unit 32 and generates (step S214) and transmits to the imaging apparatus 2 (step S215), angle change instruction information related to advice to shoot from a far position (step S215).

When the imaging apparatus 2 receives the angle change instruction information (step S118: Yes), the imaging apparatus 2 generates, based on the angle change instruction information, a second pseudo image Q2F ((a) of FIG. 21) that simulatively expresses an action of a person bringing a camera held by the person farther away from the person, in order to cause the user CU of the imaging apparatus 2 to perform shooting from a far position (step S119). The imaging apparatus 2 displays a second superimposed image Su2F ((a) of FIG. 21), which is the live view image W101 that has been superimposed with a second pseudo image Q2F and an arrow image A2F ((a) of FIG. 21) directed to the camera from the person (step S120).

If Word W7 is Said

Figure 22:
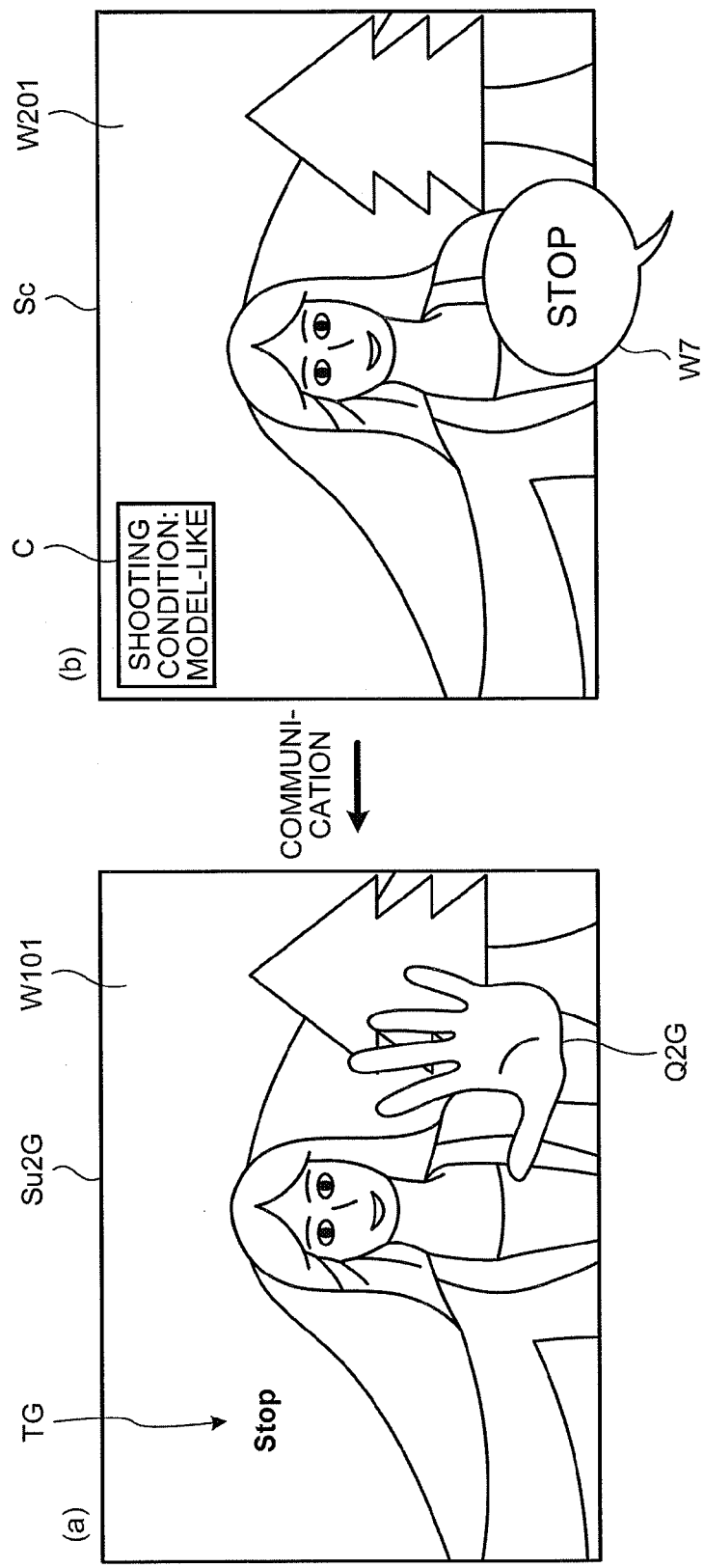
FIG. 22 is a diagram illustrating an example of the second advice operation performed by the user of the communication device and of the second superimposed image displayed by the imaging apparatus, upon the operation of the imaging system illustrated in FIG. 14 and FIG. 15.

FIG. 22 is a diagram illustrating an example of the second advice operation (word W7) performed by the user of the communication device 3 and of the second superimposed image displayed by the imaging apparatus 2, when the imaging system 1 is operated.

If the user of the communication device 3 says the word W7, such as "Stop", the communication device 3 analyzes voice data corresponding to the word W7 from the second input unit 32 and generates (step S214) and transmits to the imaging apparatus 2 (step S215), angle change instruction information related to advice notifying that a position of the imaging apparatus 2 is appropriate (step S215).

When the imaging apparatus 2 receives the angle change instruction information (step S118: Yes), the imaging apparatus 2 generates, based on the angle change instruction information, a second pseudo image Q2G ((a) of FIG. 22) that simulatively expresses an action to stop a person, in order to cause the user CU of the imaging apparatus 2 to stop moving the imaging apparatus 2 (step S119). The imaging apparatus 2 displays a second superimposed image Su2G (FIG. 22a)), which is the live view image W101 that has been superimposed with a second pseudo image Q2G and a text image TG ((a) of FIG. 22) of "Stop" (step S120).

According to the above described second embodiment, in addition to effects similar to those of the above described first embodiment, the following effects are achieved.

The imaging apparatus 2 according to this second embodiment generates and displays a second pseudo image for causing a user of the imaging apparatus 2 to change a camera angle of the imaging apparatus 2, if the action instruction information is an angle change instruction information related to advice on a camera angle of the imaging apparatus 2 with respect to the subject.

Therefore, a user of the communication device 3 is able to give advice on the camera angle of the imaging apparatus 2, in addition to the shooting spot, to the user of the imaging apparatus 2, without using other communication means such as a mobile phone.

Further, in the imaging apparatus 2 according to this second embodiment, if the user of the imaging apparatus 2 has reached close to the shooting spot instructed by the user of the communication device 3, the mode is automatically changed to a mode for receiving advice on a camera angle of the imaging apparatus 2.

Therefore, after receiving the advice on the shooting spot from the user of the communication device 3, the user of the imaging apparatus 2 does not need to do work to start communication between the imaging apparatus 2 and communication device 3 again in order to receive the advice on the camera angle of the imaging apparatus 2.

Further, the imaging apparatus 2 according to this second embodiment transmits, according to a shooting condition setting operation onto the first input unit 23 from the user of the imaging apparatus 2, shooting condition information related to a shooting condition input by that operation. The communication device 3 then displays a condition-superimposed image, which is the latest live view image that has been superimposed with the shooting condition based on the shooting condition information.

Therefore, the user of the communication device 3 is able to grasp, from the condition-superimposed image, the shooting condition (for example, "model-like") desired by the user of the imaging apparatus 2 and to give advice (advice on a camera angle of the imaging apparatus) according to the shooting condition.

Modified Example of Second Embodiment

Figure 23:
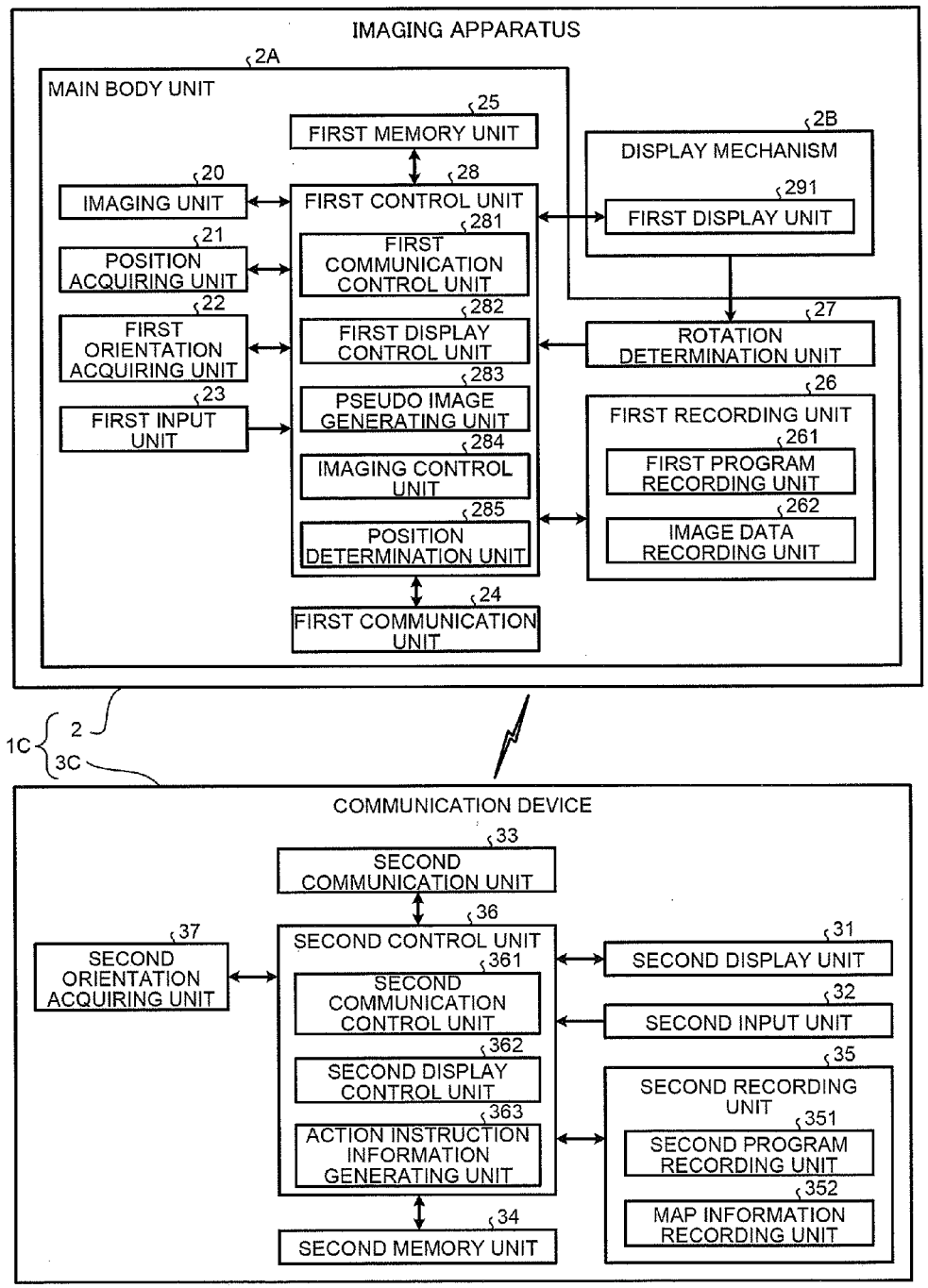
FIG. 23 is a block diagram illustrating a configuration of an imaging system according to a modified example of the second embodiment of the present invention.

FIG. 23 is a block diagram illustrating a configuration of an imaging system 1C according to a modified example of the second embodiment of the present invention.

In the above described second embodiment, the communication device 3 determines that there has been a second advice operation, according to a word said by the user of the communication device 3 (step S213: Yes), but limitation is not made thereto.

For example, as illustrated in FIG. 23, a communication device 3C forming the imaging system 10 has a second orientation acquiring unit 37 added to the communication device 3 described in the second embodiment, the second orientation acquiring unit 37 having a function similar to that of the first orientation acquiring unit 22. The second orientation acquiring unit 37 acquires second orientation information related to an orientation (posture) of the communication device 3C. When the communication device 3C is displaying a condition-superimposed image (step S212), the communication device 3C may determine that there has been a second advice operation, if a posture of the communication device 3C is changed by a user of the communication device 3C and an orientation of the communication device 3C based on the second orientation information acquired by the second orientation acquiring unit 37 is changed. For example, if the posture of the communication device 3C is changed such that a display screen of the second display unit 31 faces upwards, the communication device 3C generates and transmits to the imaging apparatus 2, angle change instruction information related to advice to shoot at a low angle.

Further, in the second embodiment, the communication device 3 analyzes the word (voice data) said by the user of the communication device 3 and generates and transmits the angle change instruction information, but not being limited thereto, it may be configured so that the voice data are transmitted as they are as the angle change instruction information and the imaging apparatus 2 is caused to perform the analysis.

Moreover, in the second embodiment, the imaging system 1 carries out both the display of the first superimposed image according to the advice on the shooting spot from the user of the communication device 3 and the display of the second superimposed image according to the advice on the camera angle of the imaging apparatus 2 from the user of the communication device 3, but not being limited thereto, it may be configured such that only the latter is carried out.

Third Embodiment

Next, a third embodiment of the present invention will be described.

In the description below, configurations and steps similar to those of the above described first embodiment will be appended with the same signs and detailed description thereof will be omitted or simplified.

An imaging system according to the third embodiment is different from the imaging system 1 described in the first embodiment only in that the function of generating the pseudo image is included in the communication device, rather than in the imaging apparatus.

Configuration of the Imaging System

Figure 24:
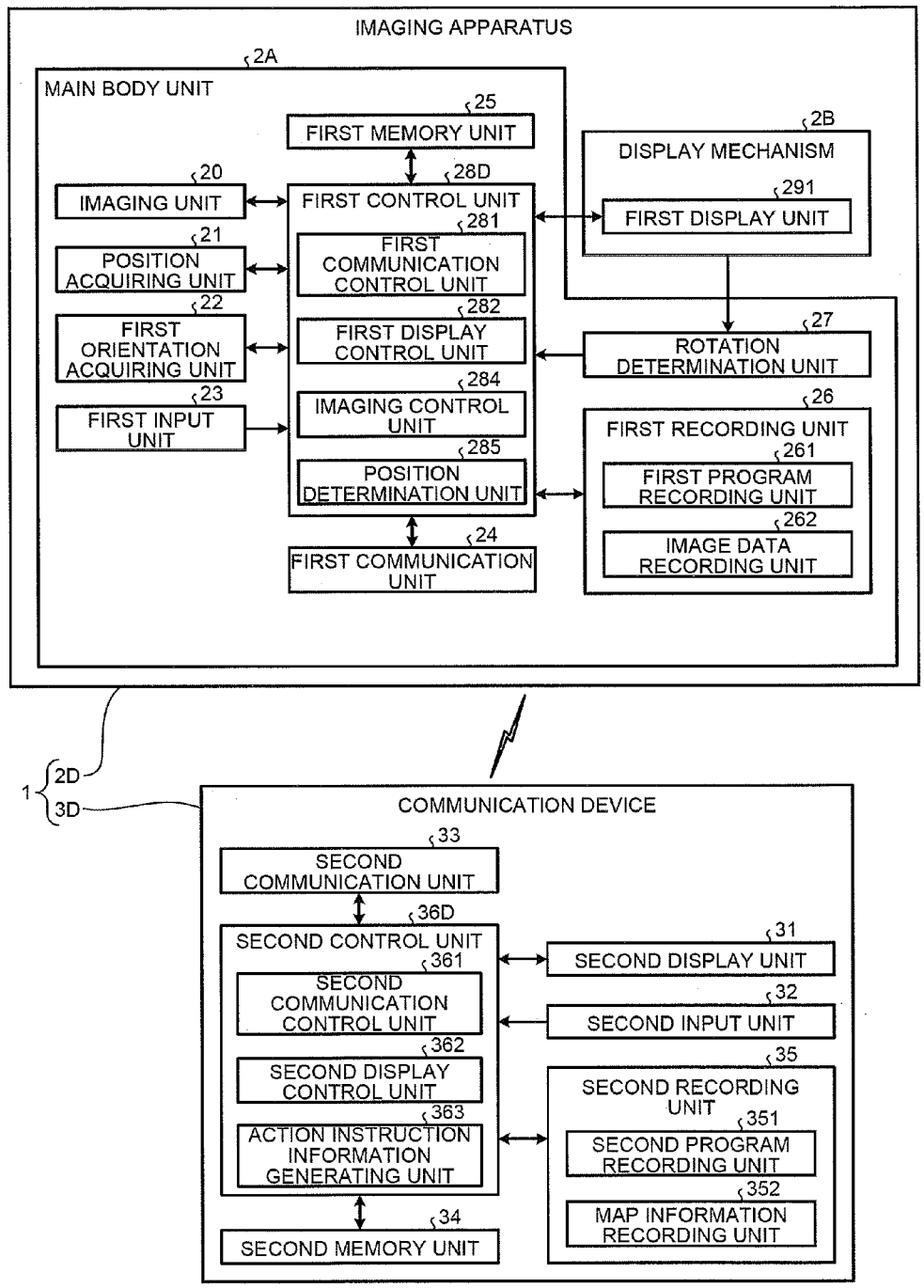
FIG. 24 is a block diagram illustrating a configuration of an imaging system according to a third embodiment of the present invention.

FIG. 24 is a block diagram illustrating a configuration of an imaging system 1D according to the third embodiment of the present invention.

In an imaging apparatus 2D forming the imaging system 1D according to this third embodiment, as illustrated in FIG. 24, the pseudo image generating unit 283 is omitted from the imaging apparatus 2 (FIG. 1) described in the first embodiment.

Further, in a communication device 3D forming the imaging system 1D according to this third embodiment, as illustrated in FIG. 24, with respect to the communication device 3 (FIG. 1) described in the first embodiment, instead of the second control unit 36, a second control unit 36D is employed, from which the action instruction information generating unit 363 is omitted and to which a pseudo image generating unit 364 having a function similar to that of the pseudo image generating unit 283 is added.

Operations of Imaging System

Next, operations of the imaging system 1D will be described.

Hereinafter, as the operations of the imaging system 1D, operations of the imaging apparatus 2D and operations of the communication device 3D will be described in order.

Operations of Imaging Apparatus

Figure 25:
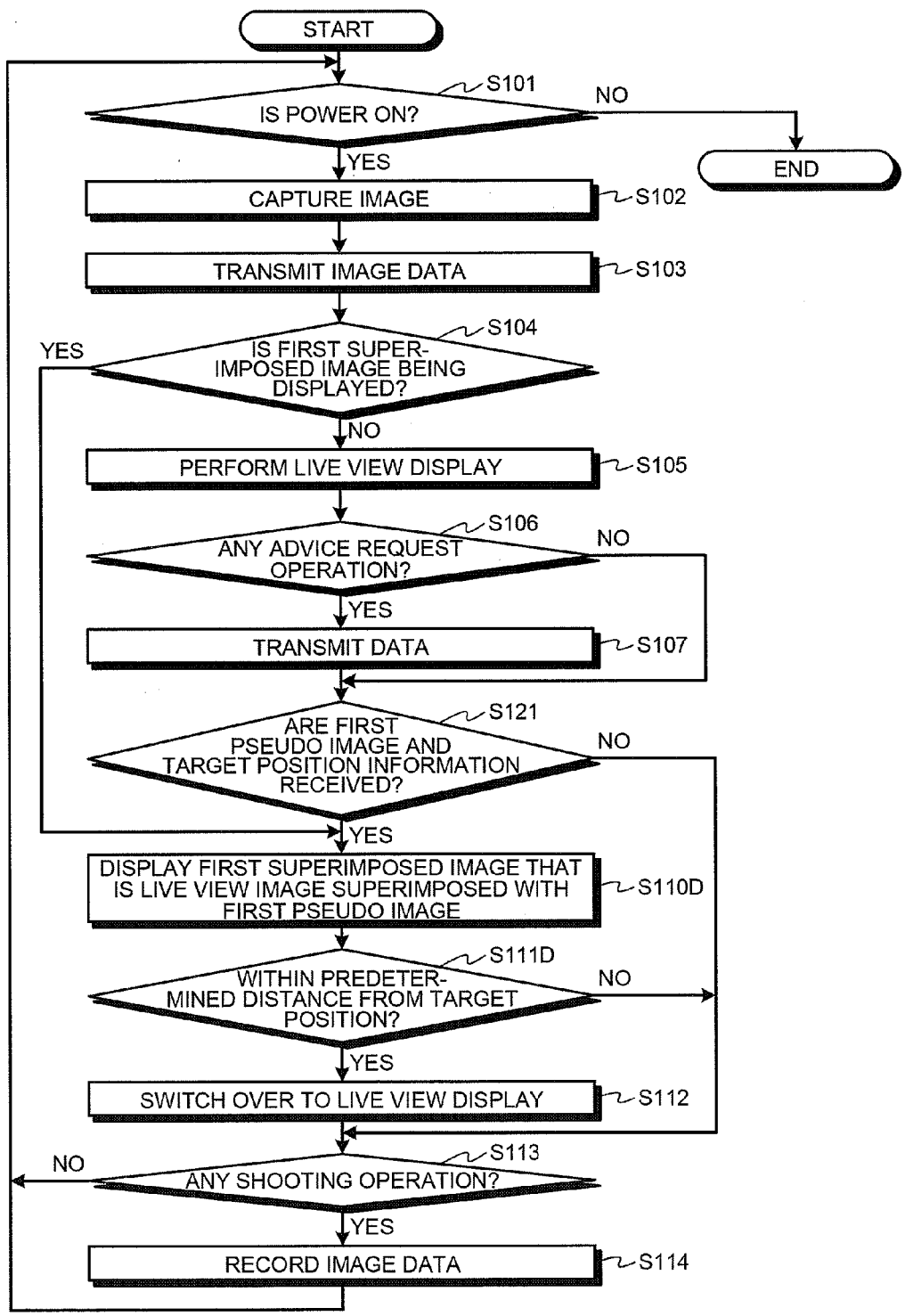
FIG. 25 is a flow chart illustrating operations of an imaging apparatus illustrated in FIG. 24.

FIG. 25 is a flow chart illustrating the operations of the imaging apparatus 2D.

The operations of the imaging apparatus 2D are different from the operations of the imaging apparatus 2 described in the first embodiment (FIG. 4) in that, as illustrated in FIG. 25, in place of steps S108, S110, and S111, steps S121, S110D, and S111D are respectively added and step S109 is omitted.

Therefore, hereinafter, only the above different points will be described.

At step S121, the first communication control unit 281 determines whether or not a first pseudo image and target position information related to a longitude and a latitude of a shooting spot (target position) have been received via the first communication unit 24 from the communication device 3D.

If it is determined that the first pseudo image and target position information have not been received (step S121: No), the imaging apparatus 2D proceeds to step S113.

On the contrary, if it is determined that the first pseudo image and target position information have been received (step S121: Yes), a first control unit 28D stores the first pseudo image and target position information in the first memory unit 25. At step S110D, the first display control unit 282 causes the first display unit 291 to display a first superimposed image, which is a live view image corresponding to the latest live view image data stored in the first memory unit 25, the live view image having been superimposed with the first pseudo image stored in the first memory unit 25.

Subsequently, at step S111D, the position determination unit 285 determines, based on the target position information stored in the first memory unit 25 and the position information acquired by the position acquiring unit 21, whether or not the current position of the imaging apparatus 2D is positioned within a specified distance from a target position based on target position information.

If it is determined that the current position of the imaging apparatus 2D is not positioned within the specified distance from the target position (step S111D: No), the imaging apparatus 2D proceeds to step S113.

On the contrary, if it is determined that the current position of the imaging apparatus 2D is positioned within the specified distance from the target position (step S111D: Yes), the imaging apparatus 2D proceeds to step S112.

Operations of Communication Device

Figure 26:
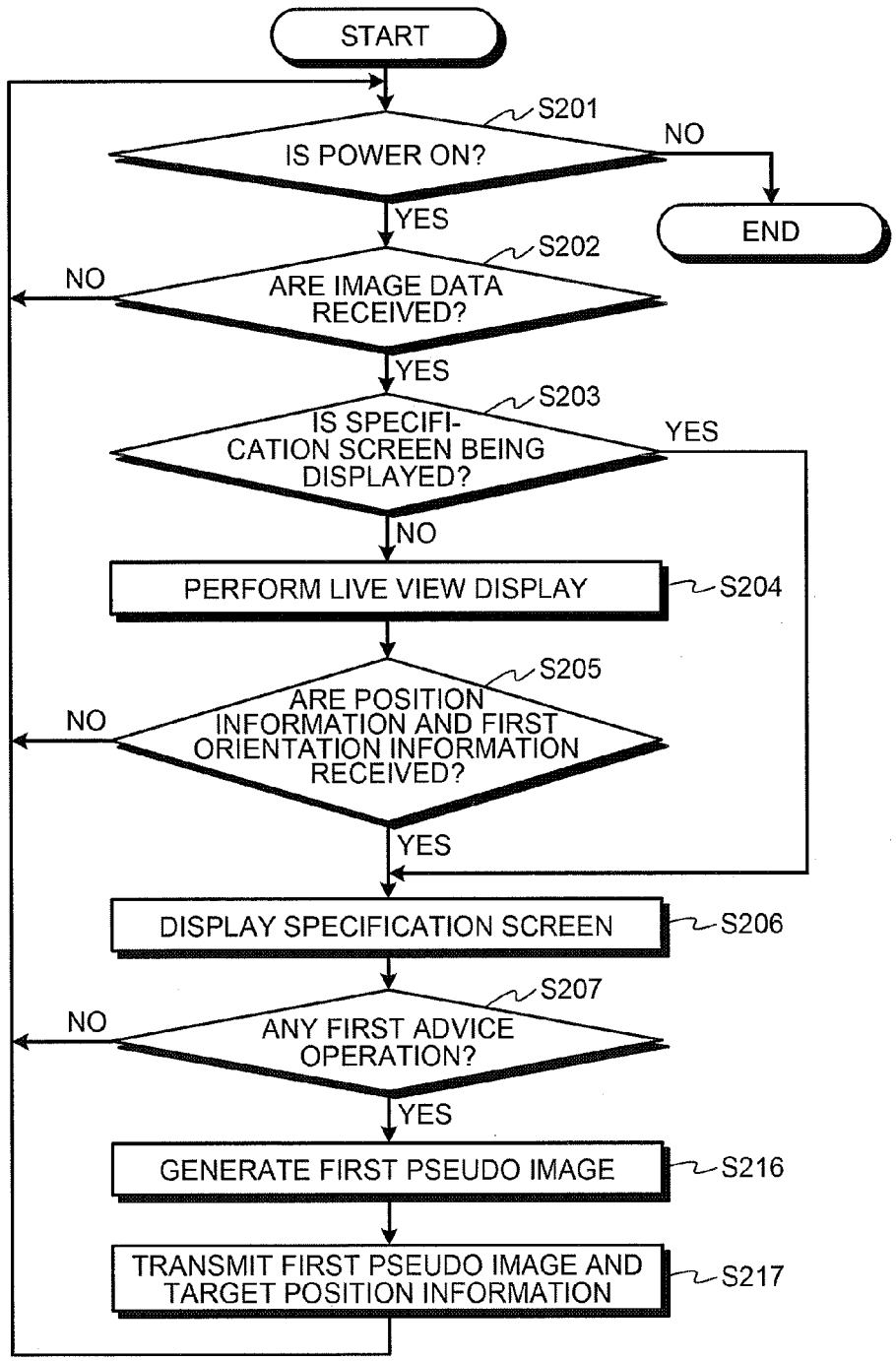
FIG. 26 is a flow chart illustrating operations of a communication device illustrated in FIG. 24.

FIG. 26 is a flow chart illustrating the operations of the communication device 3D.

The operations of the communication device 3D are different from the operations of the communication device 3 described in the first embodiment (FIG. 5) in that, as illustrated in FIG. 26, in place of steps S208 and S209, steps S216 and S217 are respectively added.

Therefore, hereinafter, only the above different points will be described.

After step S206, the pseudo image generating unit 364 determines whether or not there has been any first advice operation onto the second input unit 32 by the user of the communication device 3D (operation related to a shooting instruction (advice on a shooting spot)) (step S207).

If it is determined that there has not been any first advice operation (step S207: No), the communication device 3D returns to step S201.

On the contrary, if it is determined that there has been a first advice operation (step S207: Yes), the pseudo image generating unit 364 generates a first pseudo image that simulatively expresses an action of a user of the imaging apparatus 2D according to the shooting instruction, similarly to step S109 described in the first embodiment.

Specifically, at step S216, the pseudo image generating unit 364 generates, based on the position information and first orientation information of the imaging apparatus 2D received via the second communication unit 33, as well as on the target position information (information related to a longitude and a latitude of a shooting spot (target position) according to the shooting instruction), the first pseudo image for guiding the user of the imaging apparatus 2D to the shooting spot based on the shooting instruction information.

Subsequently, the second communication control unit 361 transmits, via the second communication unit 33, to the imaging apparatus 2D, the first pseudo image generated in step S216 and the target position information (step S217). Thereafter, the communication device 3D returns to step S201.

Like in this third embodiment of the present invention, even if the function of generating a pseudo image is included in the communication device 3D, effects similar to those of the first embodiment are achieved.

Modified Example of Third Embodiment

According to the configuration in the above described third embodiment, the function of generating a pseudo image is included in the communication device 3D rather than the imaging apparatus 2D in contrast to the imaging system 1 described in the first embodiment, but needless to say, application thereof to the imaging system 1 described in the second embodiment is also possible.

Other Embodiments

Thus far, modes for carrying out the present invention have been described, but the present invention is not to be limited only to the above described first to third embodiments.

In the above described first to third embodiments, the user of the imaging apparatus 2 or 2D has been exemplified as the subject, but not being limited thereto, anything other than the user of the imaging apparatus 2 or 2D may become the subject.

In the above described first to third embodiments, the imaging apparatus 2 or 2D transmits the position information and first orientation information of the imaging apparatus 2 or 2D or the shooting condition information to the communication device 3, 3C, or 3D, according to the advice request operation or shooting condition setting operation onto the first input unit 23 by the user of the imaging apparatus 2 or 2D, but limitation is not made thereto.

For example, an imaging apparatus transmits the position information and first orientation information or the shooting condition information to a communication device owned by a mediator who introduces a person that gives advice. The communication device owned by the mediator displays an image based on the position information and first orientation information or the shooting condition information. Based on the image, the mediator selects the person that gives the advice, and transmits the position information and first orientation information or the shooting condition information to a communication device owned by the person that gives the advice. Thereafter, similarly to the above described first to third embodiments, communication is performed between the imaging apparatus 2 or 2D and the communication device owned by the person that gives the advice.

In the above described first to third embodiments, when the image data are recorded (step S114), information mentioned below may be recorded in association with the image data.

A form of the shooting described in the first to third embodiments is collaborative work between the user (camera user) of the imaging apparatus 2 or 2D and the user (remote camera man) of the communication device 3, 3C, or 3D. Therefore, under agreement between these users, information indicating that the shooting was performed collaboratively may be recorded in association with the image data. Further, information that identifies the user of the communication device 3, 3C, or 3D may be recorded in association with the image data. Furthermore, information transmitted to the communication device 3, 3C, or 3D or information received from the communication device 3, 3C, or 3D by the imaging apparatus 2 or 2D before the image data are recorded (step S114), information indicating a history of user operations by the user of the imaging apparatus 2 or 2D, or the like may be recorded in association with the image data.

If such information is recorded in association with the image data, retrieval of images is able to be facilitated, and relations of right, such as copyright, where responsibility related to recording of the image data lies, and the like are able to be clarified.

In the above described first to third embodiments, a series of operations up to the recording of the image data (step S114) may be recorded as a moving image.

If such a moving image is recorded, the moving image becomes a moving image of making the recorded (step S114) image data and ways to enjoy images are able to be extended. In this case, the imaging apparatus 2 or 2D may record the image data (live view image data) generated in a predetermined time period including the time point at which the advice request operation is performed, the voice data corresponding to the word said by the user of the imaging apparatus 2 or 2D, and the voice data corresponding to the word said by the user of the communication device 3, 3C, or 3D (voice data transmitted from the communication device 3, 3C, or 3D to the imaging apparatus 2 or 2D).

Further, flows of these processes are not limited to the sequences of the processes in the flow charts described in the first to third embodiments and may be modified to the extent that there is no contradiction.

Further, algorithms of the processes described by using the flow charts in this specification may be described as programs. Such a program may be recorded in a recording unit inside a computer or recorded in a computer readable recording medium. Recording of the program in the recording unit or recording medium maybe performed before shipping the computer or recording medium as a product or by downloading via a communication network.

An imaging apparatus according to some embodiments generates, if the imaging apparatus receives action instruction information from an external communication device, a pseudo image simulatively expressing an action of a user of the imaging apparatus according to an action instruction that is based on the action instruction information. The imaging apparatus then displays the pseudo image. Therefore, by this pseudo image displayed by the imaging apparatus, the user of the imaging apparatus is able to recognize the action instruction instructed by a user of the communication device and perform an action corresponding to the action instruction. That is, without using other communication means, such as a mobile phone, the user of the communication device is able to variously give advice to the user of the imaging apparatus. Therefore, it is possible to improve user-friendliness thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus that images a subject, the imaging apparatus comprising:
    an imaging unit that images the subject to generate image data;

a first display unit;
a first communication unit that connects to an external communication device to transmit and receive information to and from the communication device;
a first communication control unit that transmits the image data generated by the imaging unit to the communication device and receives action instruction information related to an action instruction for a user of the imaging apparatus from the communication device, via the first communication unit;
a pseudo image generating unit that generates, when the action instruction information is received via the first communication unit, a pseudo image simulatively expressing an action by the user of the imaging apparatus according to the action instruction based on the action instruction information;
a first display control unit that causes the first display unit to display the pseudo image generated by the pseudo image generating unit;
a position acquiring unit that acquires position information related to a position of the imaging apparatus; and
a first orientation acquiring sensor that acquires first orientation information related to an orientation of the imaging apparatus, wherein
the action instruction information includes angle change instruction information related to an angle change instruction for instructing change of a camera angle of the imaging apparatus with respect to the subject and shooting instruction information related to a shooting instruction for instructing shooting at a particular location, and
the pseudo image generating unit generates, based on the position information and the first orientation information respectively acquired by the position acquiring unit and the first orientation acquiring sensor upon receipt of the shooting instruction information via the first communication unit, as well as on the shooting instruction information, a first pseudo image for guiding the user of the imaging apparatus to the particular location based on the shooting instruction information, and generates, based on the angle change instruction information, a second pseudo image for causing the user of the imaging apparatus to change the camera angle of the imaging apparatus.

2. The imaging apparatus according to claim 1, wherein the pseudo image generating unit generates, based on the position information and the shooting instruction information, a distance image related to a distance from a current position of the imaging apparatus to the particular location, and
the first display control unit causes the first display unit to display the first pseudo image and the distance image.

3. The imaging apparatus according to claim 1, wherein the first communication control unit transmits the position information acquired by the position acquiring unit to the communication device via the first communication unit.

4. The imaging apparatus according to claim 1, further comprising a position determination unit that determines, based on the shooting instruction information received via the first communication unit and the position information acquired by the position acquiring unit, whether or not a current position of the imaging apparatus is positioned within a specified distance from the particular location based on the shooting instruction information, and
when the position determination unit determines that the current position of the imaging apparatus is positioned within the specified distance from the particular location, the pseudo image generating unit generates, based on the angle change instruction information, the second pseudo image for causing the user of the imaging apparatus to change the camera angle of the imaging apparatus.

5. The imaging apparatus according to claim 1, further comprising a first operation receiving input that receives a first operation for instructing a shooting condition, wherein
when the first operation receiving input receives the first operation, the first communication control unit transmits shooting condition information related to the shooting condition to the communication device via the first communication unit.

6. The imaging apparatus according to claim 1, wherein the subject is the user of the imaging apparatus, and
the first display control unit causes the first display unit to display an image corresponding to the image data generated in the imaging unit by imaging the user of the imaging apparatus and either one of the first pseudo image and the second pseudo image to prompt the user of the imaging apparatus to perform the action according to the action instruction based on the action instruction information.

7. An imaging system comprising:
the imaging apparatus according to claim 1; and
the communication device that connects to the imaging apparatus to transmit and receive information to and from the imaging apparatus, wherein
the communication device includes:
a second operation receiving input that receives a second operation related to the action instruction for the user of the imaging apparatus;
a second communication unit that connects to the imaging apparatus to transmit and receive information to and from the imaging apparatus; and
a second communication control unit that transmits the action instruction information related to the action instruction to the imaging apparatus via the second communication unit when the second operation receiving input receives the second operation.

8. An imaging method executed by an imaging apparatus that images a subject, the imaging method comprising:
imaging the subject to generate image data;
transmitting the image data to an external communication device, and receiving action instruction information related to an action instruction for a user of the imaging apparatus from the communication device;
generating a pseudo image simulatively expressing an action by the user of the imaging apparatus according to the action instruction based on the action instruction information;
displaying the pseudo image;
acquiring position information related to a position of the imaging apparatus; and
acquiring first orientation information related to an orientation imaged by the imaging apparatus, wherein
the action instruction information includes angle change instruction information related to an angle change instruction for instructing change of a camera angle of the imaging apparatus with respect to the subject and shooting instruction information related to a shooting instruction for instructing shooting at a particular location, and
in the generating, a first pseudo image for guiding the user of the imaging apparatus to the particular location based on the shooting instruction information is generated based on the position information and the first orientation information respectively acquired upon receipt of the shooting instruction information, as well as on the shooting instruction, and a second pseudo image for causing the user of the imaging apparatus to change the camera angle of the imaging apparatus is generated based on the angle change instruction.

9. A non-transitory computer readable recording medium having an executable program recorded therein, the program instructing a processor, which an imaging apparatus has, to execute:

imaging a subject to generate image data;

transmitting the image data to an external communication device, and receiving action instruction information related to an action instruction for a user of the imaging apparatus from the communication device;

generating a pseudo image simulatively expressing an action by the user of the imaging apparatus according to the action instruction based on the action instruction information;

displaying the pseudo image;

acquiring position information related to a position of the imaging apparatus; and acquiring first orientation information related to an orientation imaged by the imaging apparatus, wherein the action instruction information includes angle change instruction information related to an angle change instruction for instructing change of a camera angle of the imaging apparatus with respect to the subject and shooting instruction information related to a shooting instruction for instructing shooting at a particular location, and in the generating, a first pseudo image for guiding the user of the imaging apparatus to the particular location based on the shooting instruction information is generated based on the position information and the first orientation information respectively acquired upon receipt of the shooting instruction information, as well as on the shooting instruction, and a second pseudo image for causing the user of the imaging apparatus to change the camera angle of the imaging apparatus is generated based on the angle change instruction.

* * * * *